United States Patent
Ananthanarayanan et al.

(10) Patent No.: US 10,303,415 B1
(45) Date of Patent: May 28, 2019

(54) MOBILE DISPLAY ARRAY

(71) Applicant: Amazon Technologies, Inc., Seattle, WA (US)

(72) Inventors: Peruvemba Ranganathan Sai Ananthanarayanan, Sunnyvale, CA (US); Danny Chan, Santa Clara, CA (US); Anuj Dron, San Jose, CA (US); Adrian Napoles, Cupertino, CA (US); Rohit Sammeta, Mountain View, CA (US); Steven James Wilkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 14/670,255

(22) Filed: Mar. 26, 2015

(51) Int. Cl.
*G06F 3/14* (2006.01)
*B64C 39/02* (2006.01)
*G05D 1/10* (2006.01)

(52) U.S. Cl.
CPC .......... *G06F 3/1446* (2013.01); *B64C 39/024* (2013.01); *G05D 1/104* (2013.01); *B64C 2201/123* (2013.01); *B64C 2201/146* (2013.01)

(58) Field of Classification Search
CPC ............... G06F 3/1446; B64C 39/024; B64C 2201/123; B64C 2201/146; G05D 1/104
See application file for complete search history.

(56) References Cited

U.S. PATENT DOCUMENTS

| | | | | |
|---|---|---|---|---|
| 7,789,339 | B2 * | 9/2010 | Sommer | B64C 37/02 244/117 R |
| 8,862,285 | B2 * | 10/2014 | Wong | B64C 39/024 353/122 |
| 9,169,030 | B2 * | 10/2015 | Wong | B64D 47/02 |
| 9,415,869 | B1 * | 8/2016 | Chan | B64C 39/024 |
| 9,524,648 | B1 * | 12/2016 | Gopalakrishnan | G08G 5/0082 |
| 9,529,359 | B1 * | 12/2016 | Annan | G05D 1/0016 |
| 9,561,852 | B1 * | 2/2017 | Beaman | B64D 1/00 |
| 9,889,933 | B2 * | 2/2018 | Beaman | B64D 1/00 |
| 2009/0118875 | A1 | 5/2009 | Stroud | |
| 2009/0219393 | A1 * | 9/2009 | Vian | G07C 5/008 348/144 |
| 2010/0017114 | A1 | 1/2010 | Tehan et al. | |
| 2010/0084513 | A1 * | 4/2010 | Gariepy | B64C 39/024 244/190 |
| 2012/0004844 | A1 | 1/2012 | Sahasrabudhe et al. | |

(Continued)

OTHER PUBLICATIONS

Office action for U.S. Appl. No. 14/670,279 dated Jan. 7, 2016, Chan et al., "Mobile Antenna Array", 5 pages.

*Primary Examiner* — Kimberly S Berona
*Assistant Examiner* — Michael F Whalen
(74) *Attorney, Agent, or Firm* — Lee & Hayes, P.C.

(57) ABSTRACT

A plurality of UAVs may be operated in a fleet, each of the UAVs in the fleet being configured to work collectively to achieve one or more functions, such as to create a display or implement an antenna array. The fleet of UAVs may operate individually and/or may be coupled to one another to operate as a collective unit. In some embodiments, one or more UAVs in the fleet may operate individually, while two or more UAVs in the fleet may be connected to one another. In such embodiments, the individual UAVs and the connected UAVs may together comprise the fleet.

20 Claims, 11 Drawing Sheets

(56) References Cited

U.S. PATENT DOCUMENTS

| | | | | |
|---|---|---|---|---|
| 2014/0236388 A1* | 8/2014 | Wong | ................... | B64C 39/024 |
| | | | | 701/2 |
| 2014/0249693 A1* | 9/2014 | Stark | ................... | B64C 39/024 |
| | | | | 701/2 |
| 2014/0374535 A1* | 12/2014 | Wong | ................... | B64C 39/024 |
| | | | | 244/17.23 |
| 2015/0009094 A1* | 1/2015 | Nissim | ................. | G06F 3/1446 |
| | | | | 345/1.3 |
| 2016/0033855 A1* | 2/2016 | Wong | ................... | G03B 37/00 |
| | | | | 353/13 |
| 2016/0041628 A1* | 2/2016 | Verma | ................... | G06F 3/017 |
| | | | | 345/156 |
| 2016/0042637 A1* | 2/2016 | Cahill | .................. | G08B 25/10 |
| | | | | 701/3 |
| 2016/0214713 A1* | 7/2016 | Cragg | ................. | B64C 39/024 |
| 2016/0236346 A1* | 8/2016 | Lee | ........................ | B25J 9/10 |
| 2016/0250933 A1* | 9/2016 | Kim | ..................... | B60L 11/182 |
| | | | | 320/108 |
| 2016/0288918 A1* | 10/2016 | Yates | ................... | B64D 39/00 |
| 2016/0304217 A1* | 10/2016 | Fisher | ............... | B60L 11/1809 |
| 2016/0378108 A1* | 12/2016 | Paczan | .................. | B64C 37/02 |
| | | | | 705/330 |
| 2017/0101177 A1* | 4/2017 | Smirnov | ............... | B64C 37/02 |
| 2017/0137125 A1* | 5/2017 | Kales | .................. | B64C 39/024 |
| 2017/0144757 A1* | 5/2017 | Hall | ...................... | H04L 67/10 |
| 2017/0190422 A1* | 7/2017 | Beaman | .................. | B64D 1/00 |
| 2017/0285664 A1* | 10/2017 | Wang | ................... | G05D 1/104 |
| 2017/0369169 A1* | 12/2017 | Lee | ........................ | B64D 5/00 |

* cited by examiner

MOBILE DISPLAY ARRAY

BACKGROUND

Unmanned aerial vehicles (UAVs), also known as UAVs, have become increasingly popular. The use of UAVs spans from small-scale hobby use to large-scale military operations. Because of the widespread use, UAVs of all shapes and sizes are constructed for a myriad function. Among the popular functions of UAVs are photography and package delivery, to name a couple.

Because of possible collision with other aircraft and obstacles due to an inability to see-and-avoid, UAVs are typically designed and operated to achieve their specific functionality as a single unit. Thus, while occupying a particular airspace, a UAV operator or the UAV itself, if flying autonomously, will maneuver as necessary to avoid other UAVs, aircraft, and obstacles in the sky.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1A depicts a UAV with a substantially translucent display coupled to an airframe of the UAV. FIG. 1B depicts the UAV with a display with a plurality of pixels. FIG. 1C depicts the UAV with illuminated pixels in the form of an image.

FIG. 5A depicts a UAV with an antenna coupled to the airframe. FIG. 5B depicts a fleet of UAVs configured to provide an antenna array.

DETAILED DESCRIPTION

Figure 1A:
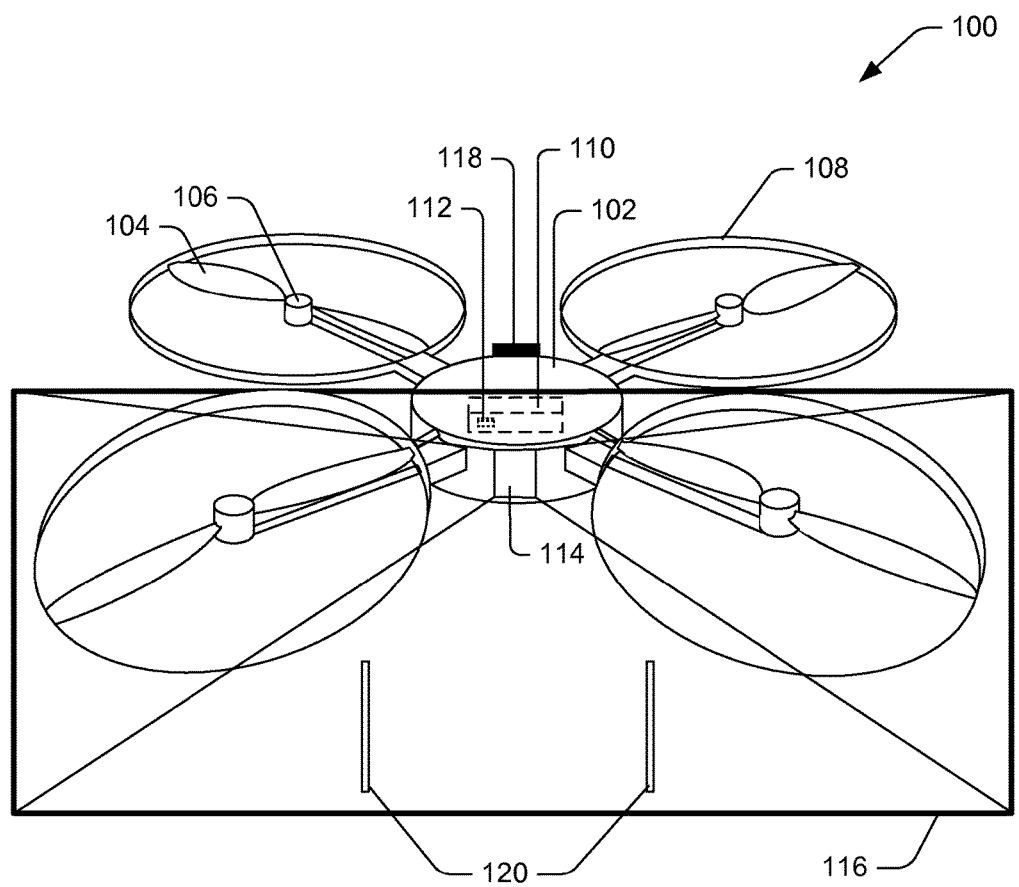
FIGS. 1A-1C are perspective views of a UAV with a screen.

This disclosure is generally directed to operating a plurality of UAVs in a fleet, each of the UAVs in the fleet being configured to work collectively to achieve one or more functions. The fleet of UAVs may operate individually and/or may be coupled to one another to operate as a collective unit. In some embodiments, one or more UAVs in the fleet may operate individually, while two or more UAVs in the fleet may be coupled to one another. In such embodiments, the individual UAVs and the coupled UAVs may together comprise the fleet.

For example, the fleet of UAVs may be made up of three groups of UAVs. The first group of UAVs each has a display coupled to an airframe of the UAV. The UAVs may fly in a formation such that the displays may combine into a single display screen, such as a movie theater screen. The display screens may be touching or may be separated by a threshold distance range. The second group of UAVs may be positioned around the crowd watching the screen to provide an enhanced surround sound audio presentation corresponding to the visual presentation presented on the display screen. The third group may fly around the crowd to provide a third sensory experience, such as audio or a mist, such as when the video displays fog or rain, to give the audience a more rich viewing experience.

In some embodiments, UAVs in the fleet may form an antenna system, capable of transmitting and/or receiving data. In such an example, the fleet of UAVs may be configured to act as an antenna array to increase transmission capabilities and/or increase a gain of the collective antenna system.

In accordance with various embodiments, the fleet of UAVs may be made up of UAVs of similar shape and size. In some embodiments, the UAVs in the fleet may be of different shapes and sizes. Regardless of the size of individual UAVs which make up the fleet, each of the individual UAVs may be configured to do substantially the same function, such as transmit and receive signals. Additionally or alternatively, some of the UAVs in the fleet may be configured to do some functions, while others in the fleet may be configured to do at least some other different functions. Using the example above with a fleet comprised of three groups of UAVs, the UAVs in the first group comprising the screen may be relatively small UAVs configured to present a visual display, while the UAVs in the third group may be of a larger size and may be configured to provide an alternate sensory experience.

In various embodiments, each of the plurality of UAVs may comprise stability augmentation sensors, such as accelerometers, gyroscopes, and the like. Thus, each of the plurality of UAVs may be capable of operating individually. The input from the stability augmentation sensors may be processed by a control management system.

Additionally or alternatively, when connected, one or more UAVs may provide certain sensory input to a centralized control management system. For example, a fleet comprising nine UAVs connected in a 3-by-3 configuration may use the accelerometers and gyroscopes data from the UAVs located on the four corners, and may use the center UAV as the collective control management system. In such a configuration, the data transfer between the nine UAVs may be decreased, thereby reducing the power output and increasing a flight endurance capability of the fleet.

In various embodiments, when connected, the two or more UAVs may share data, electrical power, and/or other resources. Each individual UAV may monitor the state of one or more batteries located on the individual UAV. In some embodiments, the control management system on the individual UAV may communicate a battery status with the control management systems located on other UAVs in the fleet. In some embodiments, the control management system on the individual UAV may communicate the battery status directly to the centralized control management system and/ or other centralized computing system of the fleet. If one or more UAVs in the fleet have a lower battery level than one or more other UAVs in the fleet, the control management systems and/or other centralized computing system may cause the one or more UAVs with a greater charge to transfer battery power to the one or more depleted UAVs. Additionally or alternatively, the one or more UAVs with a greater charge may be configured to power the one or more depleted UAVs until the battery storage are sufficiently similar.

In accordance with various embodiments, each UAV in the fleet may be configured to see and avoid other UAVs in the fleet. In such embodiments, the UAVs may comprise additional sensors, such as global positioning sensors, ultrasonic sensors, proximity sensors, radar systems, etc. In some embodiments, the control management system may be configured to process the additional sensory input. The control management system may also be configured to communicate the additional sensory input to a remote computing device.

In various embodiments, the UAVs in the fleet may be configured to operate autonomously and/or under control of a remote operator. In some embodiments, the UAV may receive input from a flight management system, the input comprising a flight plan. The flight plan may be comprised of one or more waypoints, orbits, or flight patterns. Regardless of the state of autonomy of each UAV, each of the UAVs in the fleet may be configured to communicate with other UAVs and/or a remote operator via wired and/or wireless communication channels.

The apparatuses, techniques, and systems described herein may be implemented in a number of ways. Example implementations are provided below with reference to the following figures.

Figure 1B:
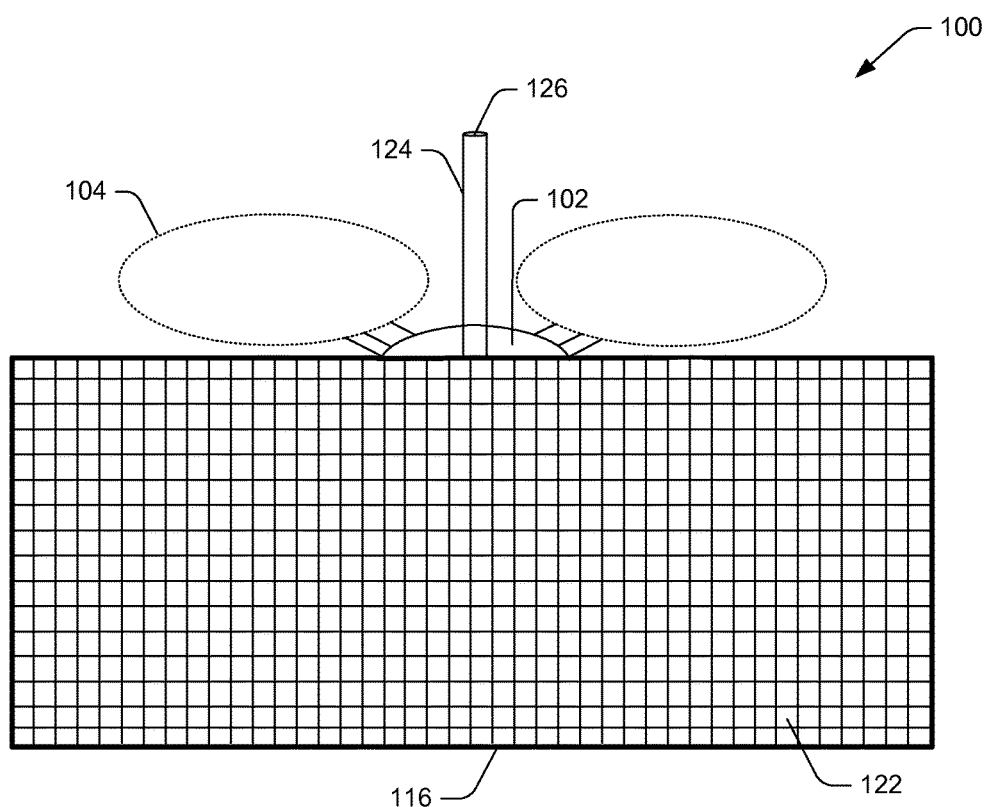
Figure 1C:
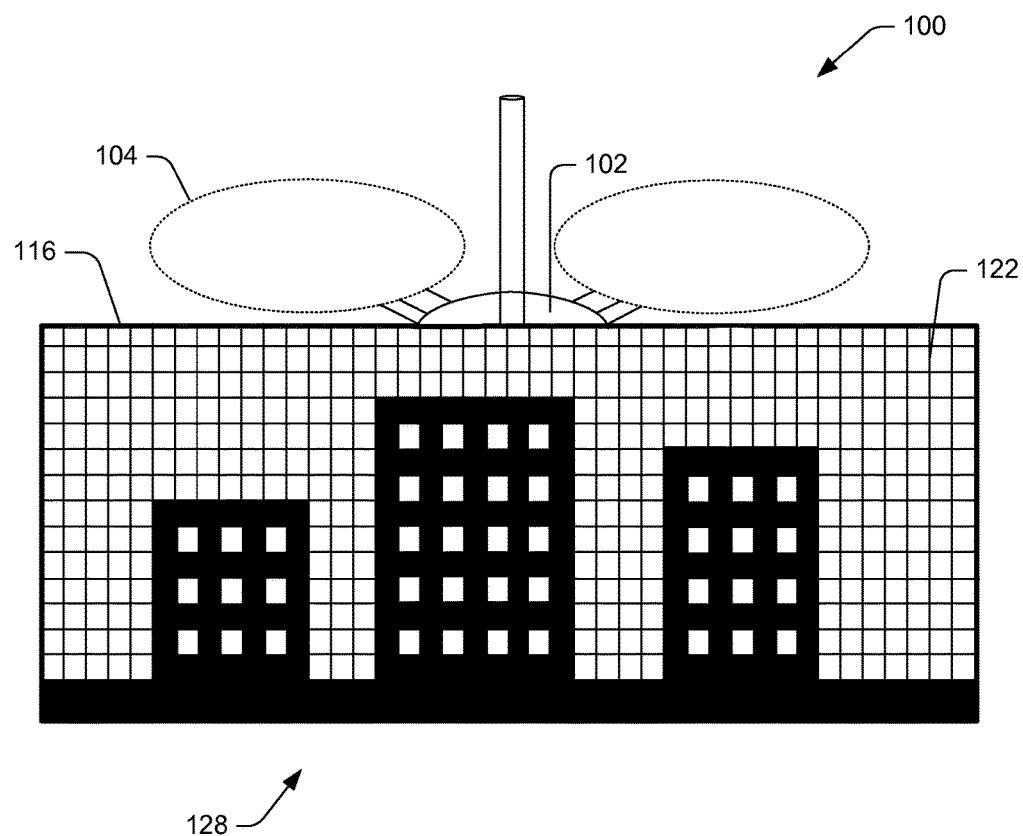

FIGS. 1A-1C are perspective views of a UAV with a screen. FIG. 1A depicts a UAV 100 with a substantially translucent display coupled to an airframe of the UAV. FIG. 1B depicts the UAV 100 with pixel elements. FIG. 1C depicts the UAV 100 with a plurality of pixel elements illuminated in the form of an image.

The UAV 100 has an airframe 102, one or more rotors 104, and one or more motors 106. The airframe 102 may comprise carbon fiber, titanium, aluminum, plastic, combinations thereof, or any other material appropriate for aircraft construction. In various embodiments, the airframe 102 may comprise rotor guards 108 to protect the one or more rotors 104. In the illustrative example, rotor guards 108 are substantially circular, and in the plane of the rotors 104. In some embodiments, the rotor guards 108 may comprise a structure which may envelop part of or all the UAV 100. For example, the rotor guard 108 may be a truss structure that is substantially circular, surrounds the UAV, and is able to absorb impact forces.

In the illustrative example, the UAV 100 is a quad-copter with four rotors 104 and four motors 106. In some embodiments, the UAV 100 may comprise a lesser or greater number of rotors 104, such as, for example, a tri-copter or an octo-copter. In some embodiments, the UAV 100 may comprise a lesser or greater number of motors 106 that are coupled to and configured to drive rotors 104. For example, the UAV 100 may comprise a single motor coupled to and configured to drive the one or more rotors 104. In various embodiments, motors 106 may comprise electrical motors. In such embodiments, the electric motors may be powered by any reasonable source of electrical power, such as, for example, lithium-ion batteries, fuel cells, solar power, nuclear power, or a hybrid technology. The motors 106 may be combustion engines, in some embodiments.

The rotors 104 may be coupled to the motors 106 via a drive shaft. In such embodiments, the motors 106 may produce power which is transmitted to the rotors 104 via the rotor shaft in order to produce thrust for propulsion. The rotor shaft may comprise a metal material (e.g., aluminum, steel, stainless steel, titanium, alloys thereof, etc.), a plastic material (e.g., high-density polyethylene, acrylic, melamine, polycarbonate, etc.), a composite material (e.g., fiberglass, carbon fiber, etc.), a wood material, and combinations of the foregoing, among others.

As depicted in FIG. 1A, the rotors 104 are the same size and/or shape (e.g. chord, thickness, and/or wingspan). In some embodiments, the rotors 104 may be different sizes and/or shapes. For example, the rotors 104 on a fore-end of the airframe may have a larger wingspan than the rotors 104 on an aft-end of the airframe, or vice versa.

The rotors 104 may comprise a composite material, a wood material, a plastic material, a metallic material, or a combination thereof. In various embodiments, the rotors 104 may be variable speed, variable pitch rotors. In other embodiments, the rotors 104 may be variable speed, fixed pitch rotors. In yet other embodiments, the rotors 104 may be fixed speed, variable pitch rotors. Additionally or alternatively, various embodiments may include one or more of the foregoing rotors used in combination with one or more of a different foregoing rotor, or other propulsion systems.

In various embodiments, the speed and/or pitch of the rotors may be determined by a control management system 110 based upon input from one or more inertial sensors (e.g., accelerometers, gyroscopes, magnetometers, etc.) and/or positioning sensors (e.g., global positioning sensors, ultrasonic sensors, radar systems, etc.). The inertial sensors may be configured to measure precise positioning data of the UAV 100 along three axes: heading, roll and pitch, and send the positioning data to the control management system 110.

In various embodiments, the control management system 110 may be a motherboard with sensors and processors. In some embodiments, the control management system 110 may be configured to receive flight management input (e.g., direction, velocity, altitude, waypoints, geolocation, etc.) directly from a flight management system 112. In such embodiments, each UAV in the fleet of UAVs may be capable of operating autonomously. The flight management input may comprise a flight plan. In some embodiments, the flight plan may comprise a series of waypoints determined by a latitude, longitude, and altitude, a position on a 3-dimensional grid system, or a combination thereof. Additionally or alternatively, the flight plan may comprise an altitude and/or series of altitudes to fly and/or distance to maintain from each of the other UAVs in the fleet of UAVs 100. For example, UAV A may be programmed to fly a horizontal distance of 16 inches from UAV B, and a vertical distance of 16 inches from UAV F throughout a display portion of the flight plan.

In various embodiments, the control management system 110 may receive flight management input from a remote computing device via flight management system 112. In some embodiments, the control management system 110 may receive the flight management input directly from the remote computing device. For example, an operator conducting the flight of the fleet of UAVs may input a flight plan, or changes thereto to the fleet of UAVs. For example, the operator may choreograph a presentation of multiple images and mobile display screens real time using a remote control device that sends flight plan data to the fleet of UAVs.

Responsive to receiving the positioning data and/or flight management input, the control management system 110 may send output signals to one or more of the rotors 104, directing each of the rotors 104 to increase and/or decrease speed and/or pitch as necessary to maintain the desired flight regime. In some embodiments, the control management system may send output signals to each motor 106, directing the motors to turn on, turn off, idle, increase, or decrease power. In some embodiments, the control management system 110 may adjust and/or control the orientation of the UAV 100 via the speed and/or pitch of the rotors 104.

In some embodiments, the airframe 102 may be configured to house a plurality of components, such as the control management system 110, one or more batteries, one or more antennas, or other similar components which power the UAV 100 and/or enable communication, data transfer, and the like. In various embodiments, the processors of the control management system 110 may be configured to monitor the plurality of components and/or power remaining in order to determine if a component is failing, has failed, and/or if a critical amount of power remains (e.g. 10-20% of battery life remaining in the UAV).

In various embodiments, the airframe 102 may comprise one or more attachment modules 114. The attachment module 114 may be configured to secure equipment to the UAV 100, such as display 116 or other equipment necessary to achieve the functionality of the fleet of UAVs. The equipment may comprise may couple external battery packs, gesture sensors, distance sensors, ultrasonic sensors, collision avoidance systems, cameras, lights, reservoirs to hold fluids, speakers, and any other reasonable payload.

For example, a gesture sensor may be mounted on the airframe, and may be configured to allow the UAV and/or fleet of UAVs to interact with a crowd. For another example, a camera may be mounted on the airframe in order to capture a reaction of the audience to a particular scene on the display. For yet another example, an antenna may be coupled to the airframe of each UAV in the fleet of UAVs via a gimbaled attachment module. The gimbal may allow the antenna to adjust to a particular azimuth and/or elevation in order to direct a particular transmission. In such an example, the fleet of UAVs may be capable of acting as an antenna array to transmit or receive data.

In various embodiments, the attachment module 114 may be a gimbaled attachment. Thus, the equipment may be capable of rotation in a 360 degree plane, rotation about a vertical axis, and/or rotation about a horizontal axis. In various embodiments, the equipment may be coupled to the attachment module 114 via one or more telescopic arms. In such an embodiment, the equipment can be adjusted closer to and further away from the airframe 102 as necessary to maintain stable flight. For example, when multiple UAVs fly in a stacked formation, it may be desirable for the rotors to be offset, such that the rotor wash from one UAV does not adversely affect the ability of a UAV below to generate lift.

In various embodiments, a counterweight 118 may be coupled to the airframe 102 in order to offset the balance of equipment coupled to attachment module 114. In various embodiments, the counterweight 118 may be coupled to an attachment module 114 opposite the equipment. The counterweight 118 may be a metal material, a plastic material, or any other material suitable as a counterweight. In various embodiments, the counterweight 118 may be removable and replaceable. For example, a first counterweight may be used to offset a 2 pound display, and a second may replace it to offset a 1 pound display.

In the illustrative example shown in FIG. 1A, the display 116 is a display screen, onto which an image may be projected. In such an embodiment, a projector may be mounted in the airframe with a hole provided for the images to project through, or the projector may be coupled to the airframe via attachment module 114. In some embodiments, the display may comprise a light-emitting diode (LED) display, an electroluminescent display (ELD), an electronic paper (E ink), a plasma display panel (PEP), a liquid crystal display (LCD), an organic light-emitting diode (OLED) display, surface-conduction electron-emitter display (SED), a laser TV, carbon nanotubes, a quantum dot display, an interferometric modulator display (IMOD), or any other type of display.

As depicted in FIG. 1A, the display 116 is a rectangular shape configured in a landscape mode. However, it is understood that the display 116 may be configured in a portrait mode. In various embodiments, the combined display may comprise a plurality of displays in the landscape mode, and a plurality of displays in the portrait mode. In some embodiments, displays 116 may comprise a square shape, an ovular shape, a circular shape, a hexagonal shape, an octagonal shape, or any other shape.

In various embodiments, one or more UAVs 100 may fly in a formation such that the displays 116 on each UAV 100 may visually and/or physically connect to create a larger display. In some embodiments, the displays 116 may be mounted on gimbaled attachment modules 114, such that the displays may adjust about the horizontal and/or vertical axes, and/or rotate about a plane to facilitate the visual appearance of creating a combined display. In such embodiments, the UAVs may fly in a formation and adjust the displays 116 such that the displays 116 combine to create the appearance of a 3-dimensional object.

In various embodiments, display 116 may comprise one or more vents 120 to allow air to flow through the display. In such embodiments, the one or more vents 120 may be so small as to be undetectable to a viewer from a distance. The one or more vents 120 may provide a means by which air may flow, in order to assist in the control of the UAV.

FIG. 1B depicts the UAV 100 with a display 116 comprising a plurality of pixels 122. The pixels may comprise the elements of a light-emitting diodes (LED), an electroluminescent display (ELD), an electronic paper (E ink), a plasma display panel (PEP), a liquid crystal display (LCD), an organic light-emitting diode (OLED) display, surface-conduction electron-emitter display (SED), a projector display (including a projector and screen) a laser TV, carbon nanotubes, a quantum dot display, an interferometric modulator display (IMOD), or any other type of display. In some embodiments, the display 116 may comprise a single pixel 122.

In various embodiments, the display 116 may have a coupling system along an outer edge. The coupling system may comprise a magnetic connector, an adhesive (e.g., glue or tape), a hook and loop connector, a latch connector, a snap fit connector, or any other reasonable method for securing two objects together. In such an embodiment, one or more displays 116 may couple together to create a larger screen, such as that shown by fleet of UAVs 200.

In various embodiments, airframe 102 may further comprise an airframe coupling system 124 which may enable two or more UAVs 100 to connect. In some embodiments, the airframe coupling system 124 may comprise fixed and/or telescopic arms, coupled to the airframe 102. In such embodiments, the fixed and/or telescopic arms may be decoupleable from airframe 102. Additionally or alternatively, the airframe coupling system 124 may comprise cables and/or wires coupled to the airframe with one or more connectors.

In various embodiments, the airframe coupling system 124 may comprise one or more connectors 126, such as a magnetic connector, an adhesive, a ball and socket connector, a hook and loop connector, a latch connector, a snap fit connector, or any other reasonable method for securing two objects together. In some embodiments, the connectors 126 may provide a means by which the UAV 100 may transfer data, power, and/or other resources to other UAVs in the fleet.

The one or more connectors 126 may enable the UAVs 100 to couple to and decouple from one another in flight. For example, the UAVs may be connected in a formation in which the displays combine to create a giant display with a top half and a bottom half Responsive to a signal from one or more control management systems, the UAVs which comprise the bottom half of the giant display may decouple from the UAVs that comprise the top half, thereby creating two large displays.

FIG. 1C depicts the UAV 100 with illuminated pixels in the form of an image. In the illustrative example, the image is comprised of three objects 128. In some embodiments, the pixels may illuminate to comprise part of an image. For example, the image on the display may comprise only a portion of a skyline. Thus, when flown in formation with the remainder of the fleet of UAVs, the entire skyline may be detectable to a viewer.

Figure 2:
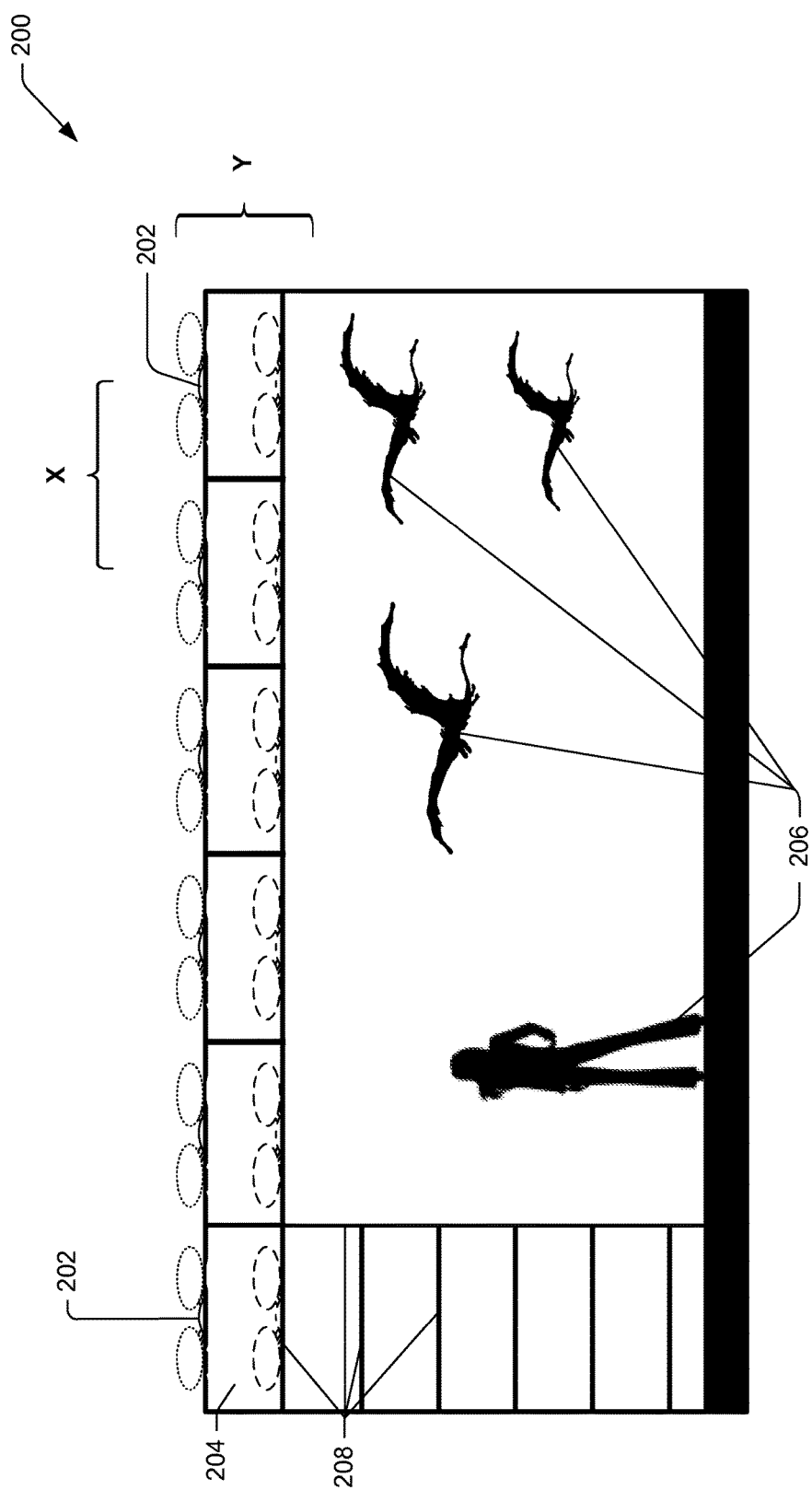
FIG. 2 is an isometric view of a fleet of UAVs flying in formation to produce a large display by combining a plurality of small displays from separate UAVs.

FIG. 2 is an isometric view of a fleet of UAVs 200, which may include the UAV 100, flying in formation to produce a large display by combining a plurality of small displays of individual UAVs.

The fleet of UAVs 200 may comprise two or more UAVs 202. In the illustrative example, the fleet of UAVs comprises many UAVs 202, each with a display 204. In various embodiments, the UAVs 202 may further comprise other sensory equipment, such as, for example, speakers to transmit sound associated with one or more images 206.

The display 204 may comprise a light-emitting diode (LED) display, an electroluminescent display (ELD), an electronic paper (E ink), a plasma display panel (PEP), a liquid crystal display (LCD), a projector display (projector and screen), an organic light-emitting diode (OLED) display, surface-conduction electron-emitter display (SED), a laser TV, carbon nanotubes, a quantum dot display, an interferometric modulator display (IMOD), or any other type of display.

Displays 204 may be different quality and/or resolution, depending on the functionality of the fleet of UAVs 200. Thus, display 204 may comprise any number of pixels or other resolution indicator (e.g., 576i, 1×1, 1024×768, 1920× 1080, 3840×2160, 7680×4320, 15360×8640, etc.). In the illustrative example, the fleet of UAVs 200 is displaying a movie scene with four images 206. In such an example, it may be desirable to have displays 204 with higher resolution and/or quality. For another example, a fleet of UAVs may be used for a New Year's countdown timer. In such an example, the fleet of UAVs may act as a segment display with each display making up one or few pixels, which may be of a lower quality than that desired for a movie screen.

In the illustrative example, the displays 204 comprise a coupling system 208 along an outer edge of each display 204. The coupling system 208 may comprise a magnetic connector, an adhesive (e.g., glue or tape), a hook and loop connector, a snap fit connector, or any other reasonable method for removably securing two or more objects together. In such an embodiment, one or more displays 204 may couple together to create a larger screen, and also provide stability to the fleet of UAVs 200 flying in formation. In some embodiments, each UAV 202 in the fleet of UAVs 200 may couple and/or decouple to one another in flight. In some embodiments, the fleet of UAVs 200 coupled together may be locked in the coupled position throughout the flight.

For illustrative purposes, the outer edges of the top row and left most column of the displays 204 are shown in FIG. 2. However, it is understood that the outer edges, or connection points, may not be visible, such as, for example, the display connection points behind the one or more images 206. In various embodiments, the displays 204 may not physically connect to one another. In such embodiments the UAVs 202 may fly close enough together to create a visual effect of a single combined display.

In various embodiments, the control management system and/or a remote device may direct a particular UAV 202 to fly at a horizontal distance X and/or a vertical distance Y from another UAV in the fleet of UAVs 200, such as a master UAV. The master UAV may be used to control other UAVs (directly or indirectly) in the fleet of UAVs 200. The horizontal distance X may be greater than, less than, or equal to the vertical distance Y, depending on the functionality of the UAV 202 and/or the fleet of UAVs 200. For example, if the functionality of the fleet of UAVs is to create a movie screen comprised of square displays, the horizontal distance X and the vertical distance Y may be equal. In some examples, the horizontal distance X and the vertical distance Y may be a range of distances. For example, a UAV providing an audio presentation to correspond with the video presentation may be directed to fly above the crowd at a certain range of distances from the combined display screen, in order to provide a life-like audio experience.

In various embodiments, a display management system in each UAV 202 may control what is depicted on each display 204, such as, for example, the one or more images 206. In various embodiments, the one or more images 206 may be saved on a memory in the display management system, or in another location on the UAV, accessible by the display management system. In some embodiments, the one or more images 206 may be transmitted to the display management system from a remote computing device via a network. For example, an operator may stream data comprising the one or more images 206 to the display management system for presentation on the displays 204.

The images 206 presented on each of the displays 204 may be synchronized such that they combine to create a combined image. In some embodiments, the images are synchronized based upon a flight plan and a corresponding media plan saved on one or more memories of each UAV 202. In such embodiments, the control management system and/or display management system may coordinate the flight and presentation based upon the flight plan and media plan. In some embodiments, the media plan may be saved on one or more memories of a master UAV. In such an embodiment, the master UAV may send signals to the servant UAVs to display a particular image or portion thereof. In some embodiments, the presentation on each display may be coordinated by a command station on a remote device. In such embodiments, the command station may send signals to each of the UAVs to change the display and/or the command station may send the signal to the master UAV to transmit the display change information to the servant UAVs.

Additionally or alternatively, the display management system in one or more of the UAVs 202 in the fleet of UAVs 200 may control an audio presentation corresponding to the one or more images 206. In such embodiments, selected display management systems may present, via one or more speakers, the audio presentation. The audio presentation may be saved and/or transmitted in a similar manner to the one or more images 206.

In various embodiments, the fleet of UAVs 200 may comprise a central display management system. In such embodiments, the central display management system may control the one or more images 206, or sections thereof, on each of the displays 204. In some embodiments, the central display management system may control the audio presentation corresponding to the one or more images 206. In such embodiments, the central display management system may cause one or more speakers on one or more UAVs to display the audio presentation. In some embodiments, the central display management system may access the audio and/or visual data to be displayed via one or more memories on one or more UAVs 202. Additionally or alternatively, the central display management system may receive, from a remote computing device, the data to be displayed, such as, for example, via streaming audio and/or video.

Figure 3:
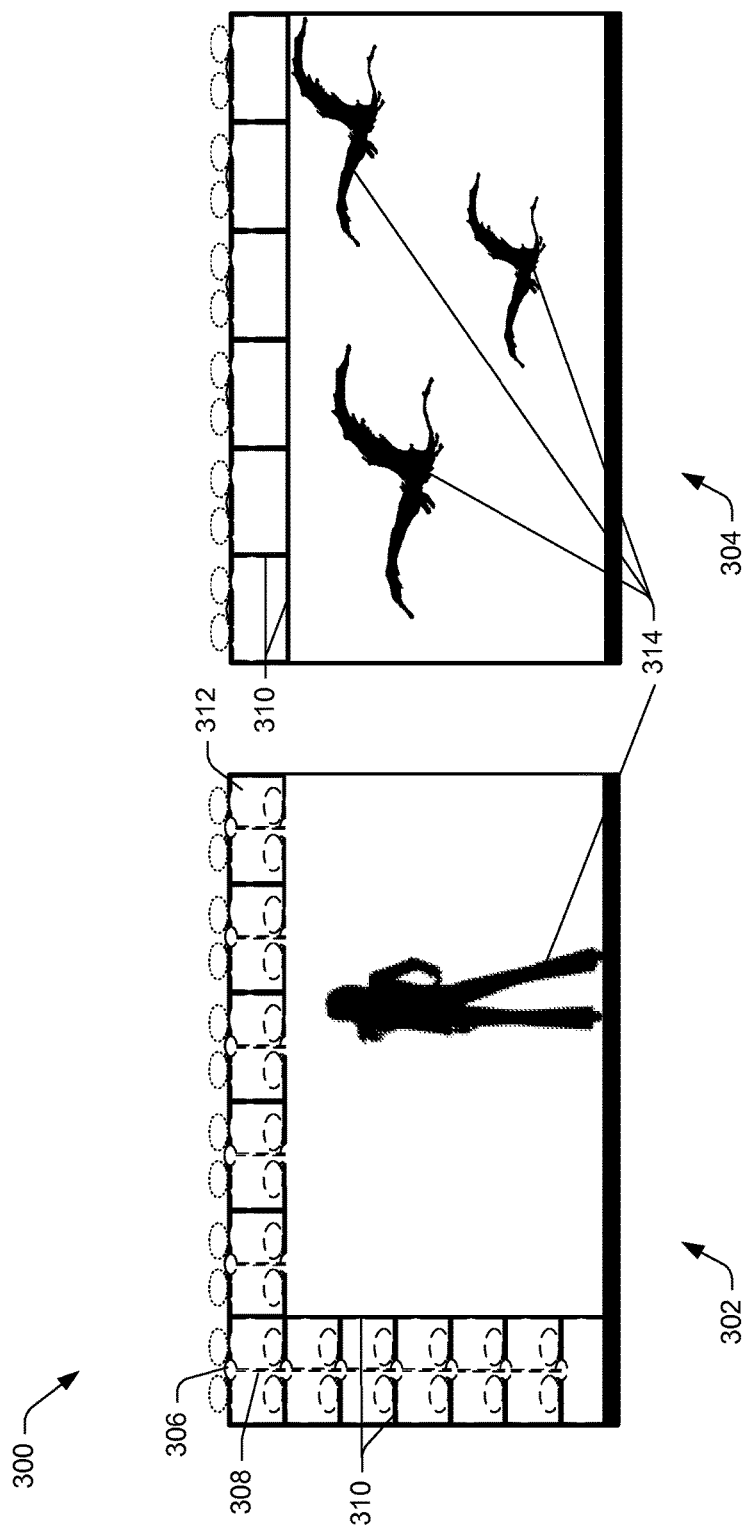
FIG. 3 is an isometric view of a fleet of UAVs separated into a first group of UAVs and a second group of UAVs, each displaying a part of a visual presentation.

FIG. 3 is an isometric view of a fleet of UAVs 300 separated into a first group of UAVs 302 and a second group of UAVs 304, each of the first group of UAVs 302 and the second group of UAVs 304 is displaying a part of a visual presentation.

In various embodiments, the UAVs 306 may fly in a formation to create a visual effect of a combined display screen, effectively merging display screens coupled to each of UAVs 306. In various embodiments, the merging of the display screens is facilitated by a coupling system. In the illustrative example, the first group of UAVs 302 are coupled together via an airframe coupling system 308, such as airframe coupling system 124 discussed with reference to FIG. 1. In some embodiments, the airframe coupling system 308 may comprise one or more fixed and/or telescopic arms which extend from the airframe of the UAV 306. Additionally or alternatively, the airframe coupling system 308 may comprise cables and/or wires coupled to the airframe.

In some embodiments, the airframe coupling system 308 may comprise one or more connectors, located at a distal end of the airframe coupling system 308. The one or more connectors may comprise magnetic connectors, adhesive connectors, hook and loop connectors, ball and socket connectors, latch connectors, snap fit connectors, or any combination thereof. The one or more connectors may affect the connection between UAVs. For example, an airframe coupling system comprising a telescopic arm may extend from a UAV, and magnetically connect to a telescopic arm of a second coupling system on a second UAV. For another example, an airframe coupling system comprising a telescopic arm may extend from a UAV and may magnetically connect to an airframe of a second UAV. For yet another example, an airframe coupling system with a telescopic arm may comprise a ball joint, and when extended from a first UAV may mate with a socket joint coupled to a second UAV.

In various embodiments, airframe coupling system 308 may extend from a top surface, a bottom surface, or one or more sides of each of UAVs 306. In some embodiments, the airframe coupling system 308 may be decoupleable. For example, as illustrated in FIG. 3, the UAVs 306 which comprise a top row and a bottom row of the first group of UAVs 302 have the respective top and bottom mounted airframe coupling systems 308 removed.

Additionally or alternatively, each UAV 306 in the fleet of UAVs 300 may comprise a display coupling system 310. In various embodiments, the display coupling system 310 may comprise one or more connectors configured along an outer edge of each display 312. The one or more connectors may comprise a magnetic connector, an adhesive connector, a hook and loop connector, a latch connector, a snap fit connector, or any other reasonable method for securing two objects together. In such an embodiment, the displays 312 may couple together to create a larger screen having imagery 314, and also provide stability to the first group of UAVs 302 and the second group of UAVs 304 flying in formation. In some embodiments, each UAV 306 in the fleet of UAVs 300 may couple and/or decouple to other UAVs in flight. In some embodiments, the UAVs 306 may be locked in the coupled position throughout the flight.

As discussed above, the one or more connectors of the airframe coupling system 308 and/or the display coupling system 310 may be capable of coupling and decoupling in flight. In the illustrative example of FIG. 2, the fleet of UAVs 200 comprises a formation in which the displays 204 combine to create a combined display with a left side and a right side. Responsive to a signal from one or more control management systems and/or a remote device, the UAVs which comprise the right side of the combined display may decouple from the UAVs that comprise the left side, thereby creating two large displays, such those depicted in the first group of UAVs 302 and the second group of UAVs 304 of FIG. 3.

As discussed above, the control management system and/or a remote device may further control the position of each UAV 306 in a fleet of UAVs 300. For example, a first combined display of the first group of UAVs 302 may remain stationary, while the second combined display of the second group of UAVs 304 may be mobile in order to better depict the flight of dragons. In such an example, the dragons depicted on the second combined display may circumnavigate the audience, thereby giving them a more rich viewing experience.

In various embodiments, one or more UAVs 306 may be configured to provide an alternate functionality. For example, while the dragons circumnavigate the crowd, a UAV comprising a heating element may fly a certain horizontal and vertical distance in front of the second combined display, simulating the dragons breathing fire on the crowd.

In various embodiments, the UAVs 306 in the fleet of UAVs may fly in a formation such that the displays visually connect to create a 3-dimensional image. For example, the first group of UAVs may be directed to fly in a formation causing the displays to combine into the image of the woman depicted on the first combined screen. Thus, the dragons may fly around a 3-D image. For another example, the second group of UAVs may be configured in a dome-shape, and flown above the first group of UAVs, thereby making the dragons appear to fly in the sky above the figure shown in the first combined display.

Figure 4:
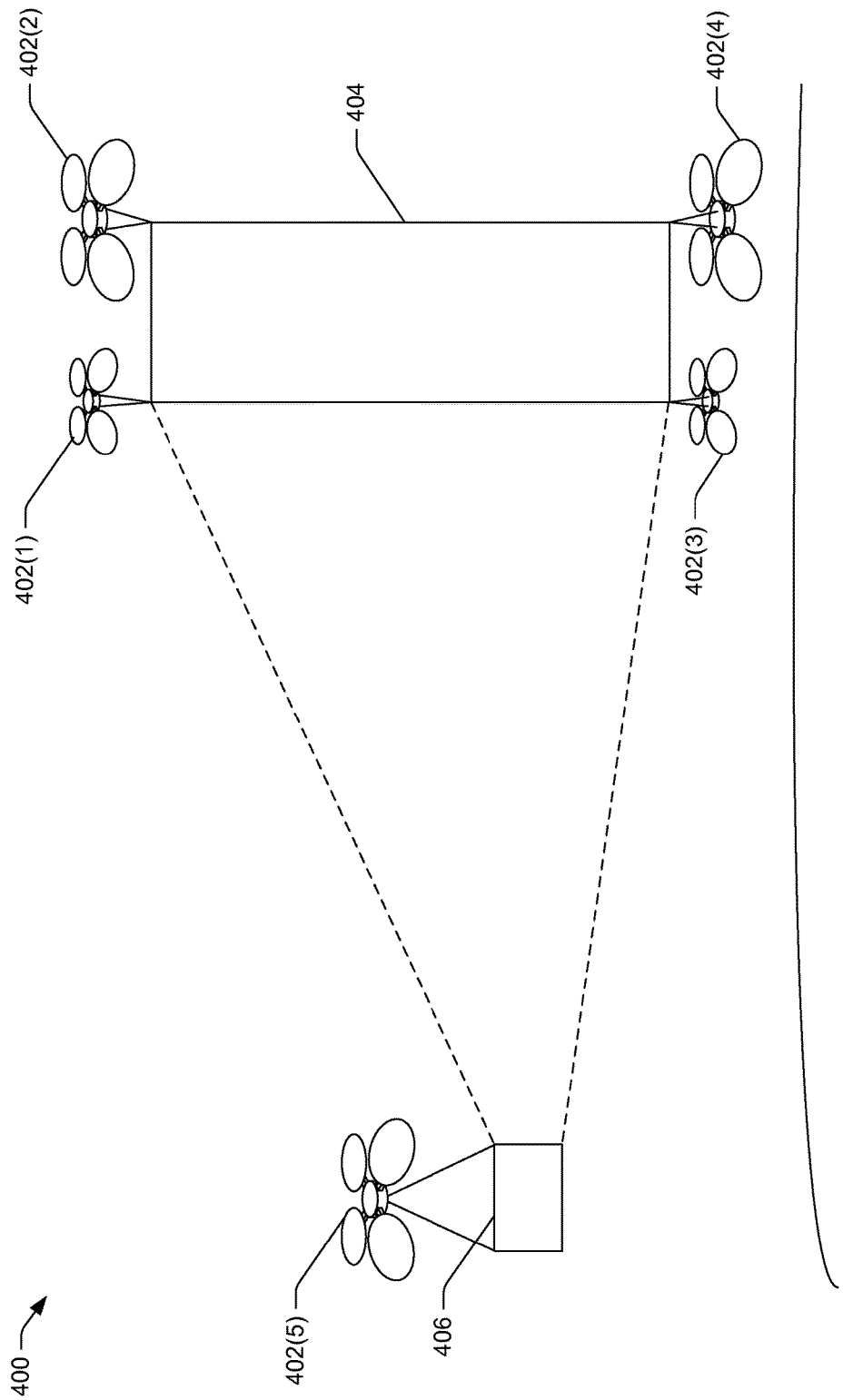
FIG. 4 is an isometric view of a fleet of UAVs flying in formation with a projector and a screen for the presentation of an image.

FIG. 4 is an isometric view of a fleet of UAVs flying in formation with a projector and a screen for the presentation of an image. As depicted, fleet of UAVs 400 comprises five UAVs 402(1), 402(2), 402(3), 402(4), and 402(5). However, it is understood that the functionality of projecting a display on a flying screen may be achieved with greater or fewer UAVs 402. It is also understood that at least part of the functionality of the visual presentation may not be coupled to a UAV, and instead may be fixed to a surface. For example, the projector providing the image to the screen may fixed to stationary surface, while the UAVs fly the display screen, or vice versa.

In the illustrative example, UAVs 402(1), 402(2), 402(3), and 402(4) are coupled to a display screen 404. In some embodiments, the display screen 404 may be coupled to the UAVs via an attachment module, such as attachment module 114, via an airframe coupling system, or any other reasonable method for supporting a display screen.

In various embodiments, the control management system in at least some of the UAVs 402 may include a centralized control management system, and/or a remote device may control the formation of the UAVs 402. In some embodiments, UAVs 402(1) and 402(2), as well as UAVs 402(3) and 402(4) may be directed to maintain a horizontal distance from one another. Similarly, UAVs 402(1) and 402(3), as well as 402(2) and 402(4) may be directed to maintain a vertical distance from one another. As such, the UAVs 402(1)-402(4) may be capable of supporting the display screen 404 in a particular orientation (e.g., a vertical and/or horizontal tension of the display). In some embodiments, the connection between UAVs 402(1)-402(4) and display screen 404 may be rigid. In such an embodiment, the UAVs 402(1)-402(4) and display screen 404 will move together and the screen will maintain an original orientation. In various embodiments, one of the UAVs 402 may be designated as a master UAV that receives commands from a controller or operation. At least some of the other UAVs 402 may be servant UAVs that may be autonomously controlled based on movement of the master UAV. Thus, to maintain formation, some servant UAVs may use movement, distances, and rotation of another UAV (the master UAV) as input to generate their own flight plan for movement, rotation, and so forth.

As depicted in FIG. 4, one or more UAVs, shown here as UAV 402(5) may comprise a projector 406, for projecting an image on the display screen 404. In such an example, the projector 406 may be coupled to UAV 402(5) via an attachment module. In some embodiments, fleet of UAVs 400 may comprise more than one UAV 402 comprising a projector. In such embodiments, multiple images may be projected on display screen 404 concurrently, possibly using projectors configured on multiple different UAVs (e.g., each UAV having one projector, etc.). In various embodiments, one or more UAVs may comprise a laser projector, and may be capable of presenting a laser light show. In such embodiments, the one or more laser projectors may aim the laser at the display screen 404, onto multiple individual display screens, such as displays 116, or into the air.

In various embodiments, a control management system of UAV 402(5) and/or a remote device may direct UAV 402(5) to fly in formation with UAVs 402(1)-402(4). In a formation, UAV 402(5) may be directed to fly at a particular horizontal and/or vertical distance, and/or or a range of horizontal and/or vertical distances, from UAVs 402(1)-402(4). Thus, the master UAV may be any one of the UAVs 402, including the UAV 402(5) having the projector 406.

Figure 5A:
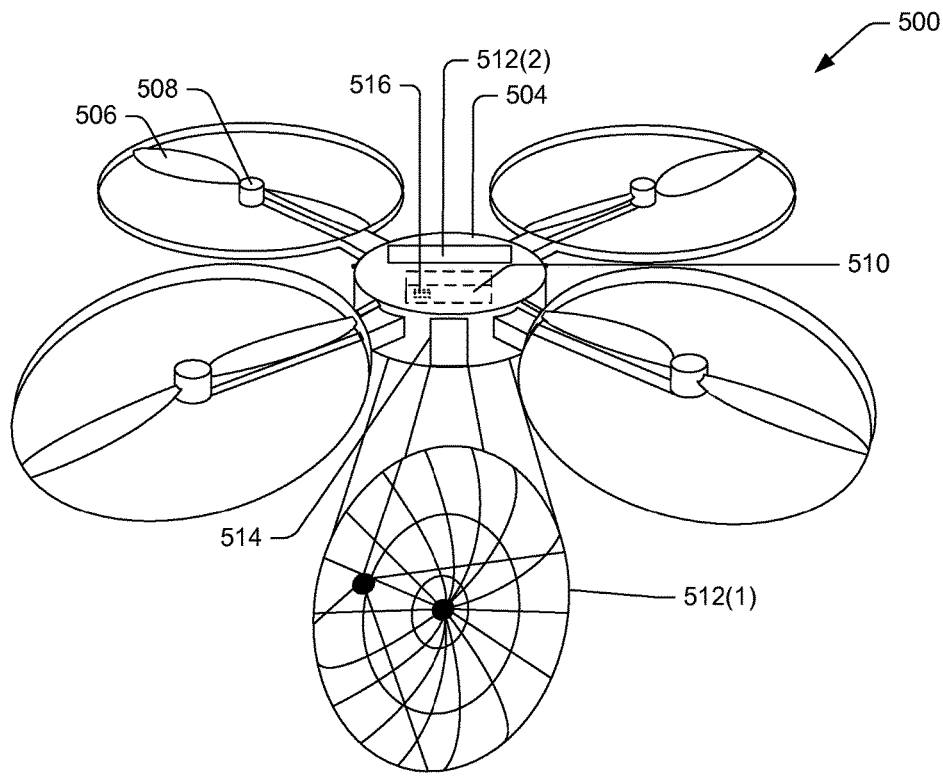
FIGS. 5A and 5B are perspective views of a UAV with an antenna.
Figure 5B:
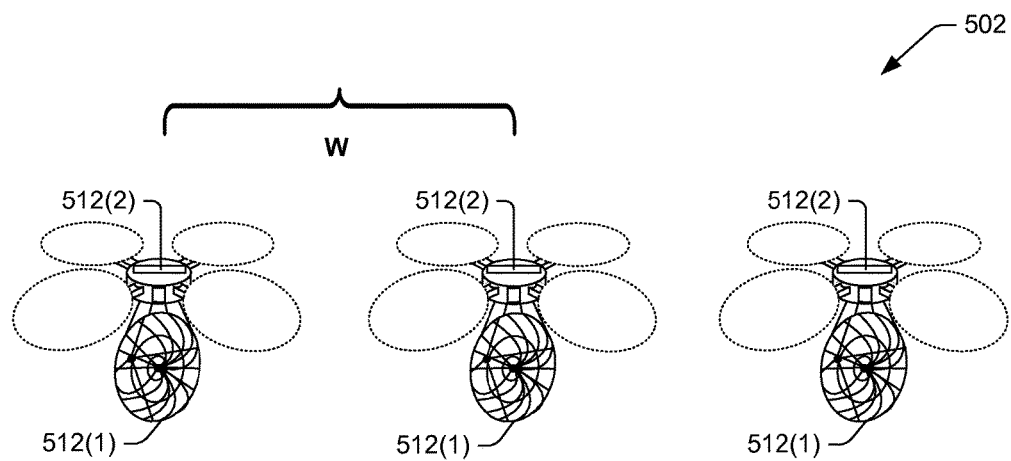

FIGS. 5A and 5B are perspective views of a UAV with an antenna. FIG. 5A depicts UAV 500, such as UAV 100, with an antenna coupled to the airframe. FIG. 5B depicts a fleet of UAVs 502 configured to provide an antenna array.

UAV 500, such as UAV 100, may comprise an airframe 504, one or more rotors 506, and one or more motors 508, coupled to, and configured to drive the one or more rotors 506. UAV 500 may comprise a control management system 510, such as the control management system 110 discussed with reference to FIG. 1. In some embodiments, the control management system 510 may be configured to receive and transmit broadcasting and/or other signals via an antenna 512 (e.g., a patch antenna, a monopole antenna, a dipole antenna, a loop antenna, bow tie antenna, slot antenna, etc.). In some embodiments, the antenna 512, such as a wire antenna, may be directly mounted to the skin of the airframe 504. In various embodiments, the antenna 512 may be mounted inside the airframe 504. In such embodiments, the antenna 512 may be mounted on a gimbal within the airframe, to provide azimuth and elevation orientation.

In various embodiments, the antenna 512(1) may be coupled to the airframe 504 via an attachment module 514, such as the attachment module 114 discussed with reference to FIG. 1. In such embodiments, UAV 500 may be configured to act as a repeater and/or amplifier to send and receive signals. In the illustrative embodiment, the UAV may comprise a single mounted antenna 512(1) attached via an attachment module on a bottom side of the airframe 504. In some embodiments, UAV 500 may comprise more than one antenna 512.

In some embodiments, the attachment module 514 may be gimbaled, thereby allowing the antenna 512(1) to rotate about one or more planes. In such embodiments, the antenna may be adjusted to transmit at a particular azimuth and/or elevation. In some embodiments, the antenna may be coupled to the attachment module 514 via one or more retractable cables. In such embodiments, each of the cables may be extended or retracted to effect an adjustment in the azimuth and/or elevation of the antenna 512(1).

In various embodiments, the control management system 510 may receive flight management input from a remote computing device via flight management system 516. In some embodiments, the control management system 510 may receive the flight management input directly from a remote computing device. For example, an operator at a transmission base station may input a flight plan, or changes thereto to the fleet of UAVs, such as via a touch pad. In such an example, the operator may adjust the location and/or the orientation of UAV and/or the orientation of the antenna to enable a transmission from the antenna in a particular direction.

In various embodiments, the antenna 512(2) may be directly mounted to the skin of the airframe 504. In such embodiments, the control management system 510 may adjust the orientation of the UAV 500 to obtain the proper azimuth and elevation for a signal transmission.

In some embodiments, the signals from a remote computing device may be received by the control management system via one or more embedded antennae, antenna 512(1), and/or antenna 512(2), via a wireless connection. In some embodiments, the signals from the remote computing device may be received via a wired connection to the remote computing device, such as, for example, via a co-axial cable connected to the base station. In such an embodiment, the co-axial cable may be coupled to the UAV 500 via an aircraft coupling system, such the aircraft coupling system 308 discussed with reference to FIG. 3. The signals may comprise flight data (e.g., latitude and longitude, grid coordinate data, orientation azimuth and/or elevation, orientation time, launch time, recovery time, etc.), data regarding other UAVs in the fleet 502, signal data (e.g., time for transmission, time to awaken from a dormant mode for transmission and/or reception of signals, etc.).

As illustrated in FIG. 5B, a fleet of UAVs 502 may be flown in formation, thereby allowing the respective antennae 512 to combine into an antenna array, thereby increasing the overall gain of each antenna. The antenna array may be a phased array, such as, for example, a sectional array, a linear array, a circular array, a planar array, a parabolic array, or a spherical array, to direct the beam. In some embodiments, the fleet of UAVs may be mobile, allowing the antenna array to set up at different locations. In some embodiments, one or more UAVs in the fleet of UAVs 502 may be coupled to a base station, such as, for example, via one or more cables. In such an embodiment, the one or more cables may provide transmission data and/or power to the UAVs in the fleet, thereby enabling longer sustained flight. For example, one UAV in the fleet act as the central unit, and may be coupled to the base station as well as the other UAVs in the fleet. As such, the central unit may transmit data and/or power to each of the UAVs in the fleet. For another example, each UAV in the fleet may be physically coupled to the base station, and may receive transmission data and/or power.

In various embodiments, the fleet of UAVs 502 may be maneuverable, thereby providing a capability of adjusting the orientation and/or distance between the UAVs based upon the particular transmission. For example, one transmission may be directed to a first azimuth and a first elevation, at a particular wavelength. Thus, the respective control management systems, a central control management system, and/or the remote computing device may direct each antenna to the first azimuth and the first elevation. Additionally, the UAVs may each move to a particular distance W from one another, the distance based upon the wavelength (e.g., one half wavelength distance, one quarter wavelength distance, etc.). The distance W may be a horizontal and/or vertical distance.

In various embodiments, the fleet of UAVs 502 may be configured to transmit signals, such as, for example, in a broadcasting mode. In some embodiments, the fleet of UAVs may be configured to transmit and receive signals, such as, for example, in a duplex mode. In some embodiments, the fleet of UAVs 502 may be configured to act as a signal repeater and/or amplifier. In such an embodiment, the fleet of UAVs 502 may send and receive signals between one or more users and one or more servers. In various embodiments, the fleet of UAVs 502 may be configured to accomplish any combination of transmitting and receiving described above.

For example, in an emergency, such as a search and rescue operation, the fleet of UAVs may be directed to fly to a remote location with limited cellular service. The fleet of UAVs may receive signals from the lost person and transmit the signals to a service provider, thereby providing a communication channel that was otherwise non-existent. For another example, an individual in a remotely-located cabin, which does not normally have access to television because of a remote location, may request to view a particular show. Based upon the request, a broadcasting service may send a fleet of UAVs to the vicinity of the cabin, and direct the fleet to broadcast the particular show.

In various embodiments, the fleet of UAVs, via the control management system, may receive signal data, such as, for example, a time to awaken from a dormant mode for transmission and/or reception of signals. The fleet of UAVs 502 may thus go into a dormant mode for a particular time to preserve energy, and increase an overall flight endurance. At the designated time, per the signal data, the fleet of UAVs 502 may awaken from the dormant mode and transmit and/or receive signals. Additionally or alternatively, the signal data may comprise a time for the transmission of a signal. Thus, the fleet of UAVs 502 may receive data to transmit, and may save the data until the designated time for transmission.

In various embodiments, the size of each UAV (e.g., 4-inch wingspan, 8-inch wingspan, 16-inch wingspan, etc.) in the fleet of UAVs 502 may be selected based at least upon the functionality and the wavelength of the signals to be transmitted and/or received. For example, a small UAV may be more effective for high frequency transmissions, whereas a large UAV may be more effective for low frequency transmissions.

In the illustrative example, the fleet of UAVs comprises three UAVs. However, it is understood that increasing the number of UAVs in the fleet may result in an increased gain of the combined antenna array and/or realize other advantages. In various embodiments, the transmission may be scalable. For example, a fleet of 25 UAVs may be capable of transmitting a signal 25 miles, yet a fleet of 100 UAVs may be capable of transmitting the signal 100 miles and covering a much larger area or volume of space.

Figure 6:
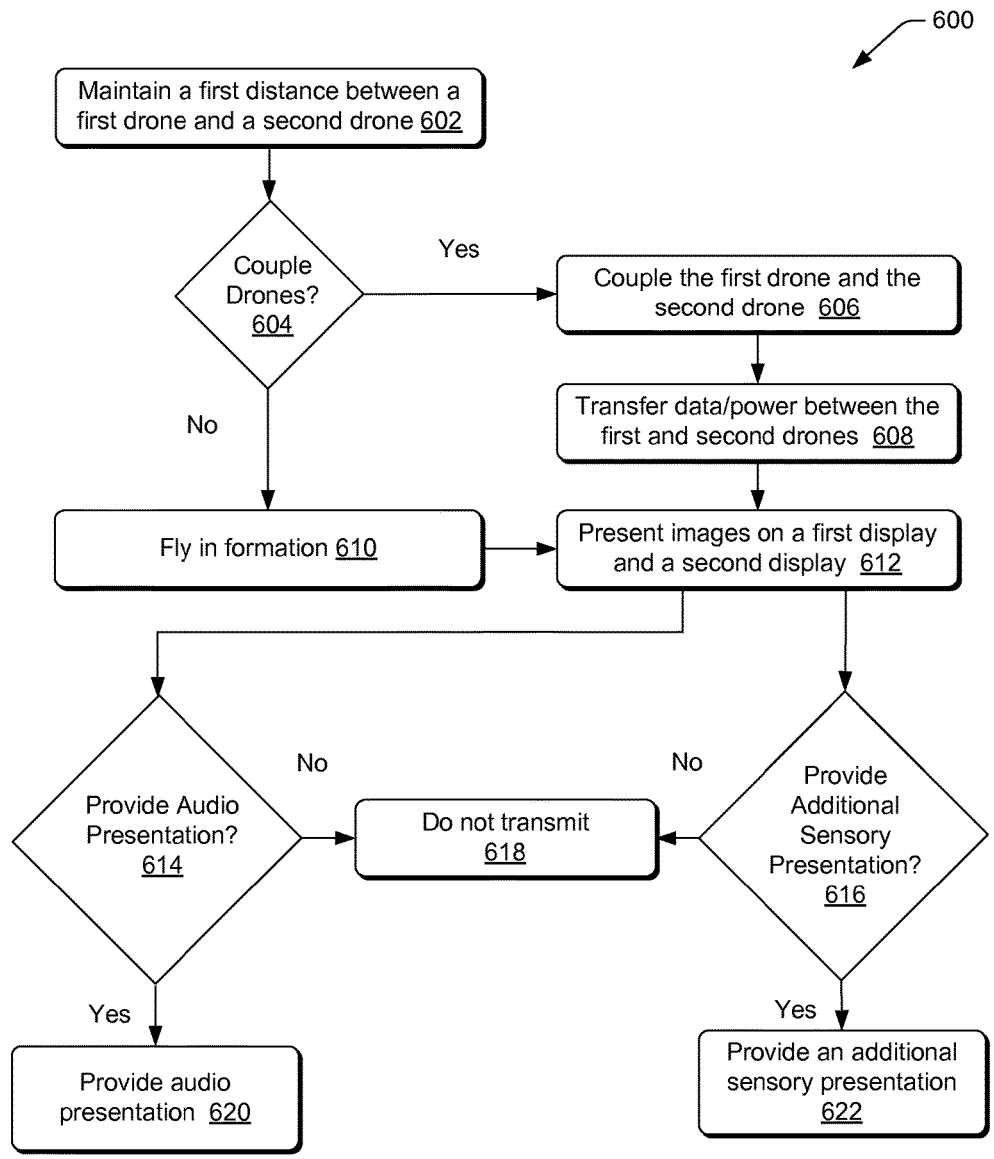
FIG. 6 is a flow diagram showing an illustrative process to launch a plurality of UAVs in a fleet of UAVs to present an image on a display as well as additional sensory input.

FIG. 6 is a flow diagram showing an illustrative process 600 to launch a plurality of UAVs in a fleet of UAVs to present an image on a display as well as additional sensory input.

At block 602, a control management system on the first UAV and a control management system on the second UAV coordinate flight between the two UAVs to maintain a first distance between the two UAVs. In various embodiments, the first distance may be maintained by the first UAV maintaining position at a first waypoint, and the second UAV maintaining a second waypoint. A waypoint may comprise a latitude, longitude, and altitude and/or a point on a grid system.

In some embodiments, the first distance may be a distance which enables a first display on the first UAV and a second display on a second UAV to visually connect to produce a combined display.

At block 604, the fleet of UAVs decides whether to couple together via one or more coupling mechanisms. In various embodiments, the decision to couple may be based upon a flight plan loaded into the respective UAVs. In some embodiments, the decision may be made by a master command station, such as a remote computing device or a central control management system on, for example, a master UAV.

Responsive to a decision to couple together, the first UAV and the second UAV may couple together via a coupling mechanism, as shown in block 606. The coupling mechanism may be a magnetic connector, an adhesive connector, a hook and loop connector, a ball and socket connector, a latch connector, a snap fit connector, or any other reasonable method of connecting one UAV to another.

In various embodiments, the coupling mechanism may comprise one or more arms which extend from an airframe of the UAV in any direction. In such embodiments the one or more arms may be rigid and/or telescopic. In some embodiments, the coupling mechanism may comprise a cable, such as a co-axial cable. In various embodiments, the coupling mechanism may be mounted on an outer edge of the display. In such embodiments, the displays may physically lock together while the UAVs are in the formation. In some embodiments, the distance between the display and the UAV may vary so that once the displays are aligned and/or coupled, a UAV is not directly in an adjacent UAVs downdraft.

While coupled together via the coupling mechanism, the first and the second UAVs may transfer data, power, and/or other resources via a connection, as depicted at block 608. In some embodiments, the connection between the first and the second UAVs may create a wired connection for data transfer. In such embodiments, the first and the second UAVs may transfer flight data (e.g., battery power remaining, flight time remaining, waypoint data, latitude and longitude, grid coordinate data, launch time, recovery time, etc.), data regarding UAVs in the fleet (e.g., battery power remaining, equipment malfunctions, etc.), presentation data (e.g., images, audio files, transmission signals, a presentation schedule, etc.), and other like data. In some embodiments, the first and second UAVs may transfer power via the connection. In such embodiments, the first UAV may send power to the second UAV to store in a battery and/or directly power one or more components in the second UAV, or vice versa.

At block 610, responsive to the decision to not couple the first UAV and the second UAV, the first and second UAVs fly in formation, maintaining a distance away from one another while each flying independently. In various embodiments, the first UAV may be configured as a master UAV, and the second UAV may be configured as a servant UAV, or vice versa. In such an embodiment, the servant UAV may maintain the distance away from the master UAV. Regardless of the coupling, in various embodiments, the UAVs may communicate and transmit data between one another, such as via one or more networks.

At block 612, the control management system and/or the display management system in the respective UAVs may cause the presentation of an image on the respective displays. The image in its entirety may be presented on the combined display. In some embodiments, the image presented on the combined display may a first part of a whole presentation.

The image presented on the combined display may be a combined with other presentations. For example, at blocks 614 and 616, the decision is made to provide an audio presentation and/or an additional sensory presentation corresponding to the images, respectively. In various embodiments, the decision may be made by the respective control and/or flight management systems. In some embodiments, the decision may be made by a master command station, such as a remote computing device or a central control management system.

At block 618, responsive to a decision to not provide an audio presentation or an additional sensory presentation, the fleet of UAVs does not further transmit sensory output.

At block 620, responsive to a decision to provide an audio presentation, the first and/or the second UAV may transmit audio output. The audio presentation may be made via one or more speakers attached to the UAV. In some examples, the audio presentation may be made via one or more speakers located remotely from the fleet of UAVs, such as on the ground.

At block 622, responsive to a decision to provide an additional sensory presentation, the first and/or the second UAV may transmit additional sensory output. The additional sensory presentation may be an audio, video, olfactory, and/or tactile presentation. For example, the additional sensory presentation may comprise a light mist falling on the crowd to simulate fog or light rain. For another example, the additional sensory presentation may comprise releasing a pungent smell to simulate passing a sulfur spring or other smelly location/object.

Figure 7:
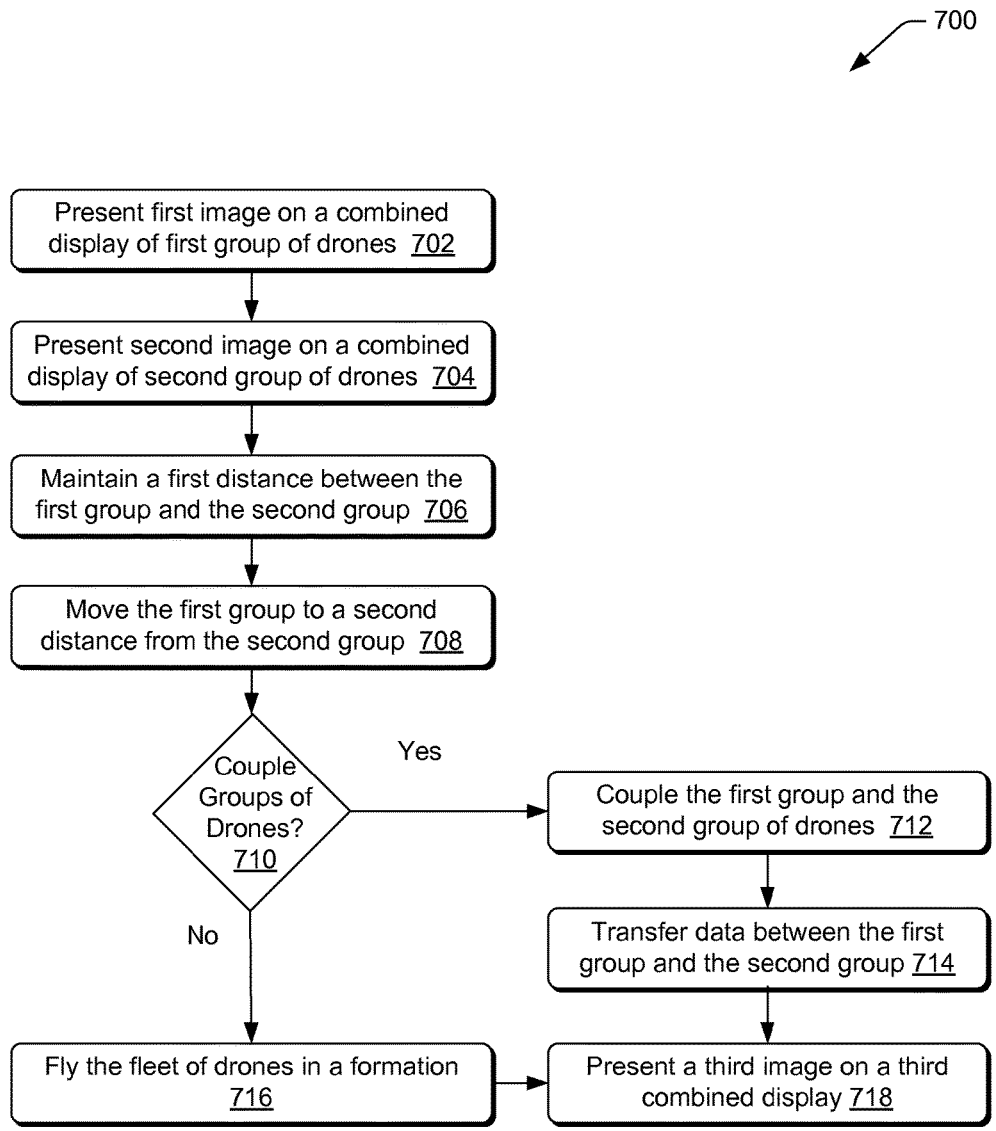
FIG. 7 is a flow diagram showing an illustrative process to launch a first group of UAVs and a second group of UAVs, the first group and the second group of UAVs presenting images on combined displays. The first group and the second group may operate independently as two separate displays, or together, as a third combined display.

FIG. 7 is a flow diagram showing an illustrative process 700 to launch a first group of UAVs and a second group of UAVs, the first group and the second group of UAVs both presenting images on combined displays. The first group and the second group may operate independently as two separate displays, or together, as a third combined display.

At block 702, similar to block 612, a first image is provided for presentation on a first combined display, the first combined display comprising two or more displays on two or more UAVs. In some embodiments, the image may be provided by the respective control and/or display management system in the respective UAVs. In some embodiments, the image may be provided by a command station, such as a remote computing device or a centralized control or display management system.

At block 704, a second image is provided for presentation on a second combined display, the second combined display comprising two or more displays on two or more UAVs. In various embodiments, the first combined image and the second combined image may comprise unrelated presentations, such as, for example, two different advertisements displayed on different sides of a sports arena. In some embodiments, the first combined image and the second combined image may comprise two parts of a whole visual presentation. For example, the first image may be that of a first person in a dialogue, while the second image may be that of a second person in the dialogue.

At block 706, a control management system on the respective UAVs and/or a command station coordinates the flight of the UAVs to maintain a first distance between the first group of UAVs comprising the first combined display and the second group of UAVs comprising the second combined display.

At block 708, the control management system on the respective UAVs and/or a command station coordinates the flight of the UAVs to move the first group of UAVs to a second distance from the second group of UAVs. In some embodiments, the second group may move to the second distance, while the first group maintains a first position. In some embodiments, the second distance may be a distance which enables the first combined display of the first group and the second combined display of the second group to visually connect so as to produce a first combined display.

At block 710, the fleet of UAVs decides whether to couple the first group of UAVs and the second group of UAVs via one or more coupling mechanisms. In various embodiments, the decision to couple may be based upon a flight plan loaded into the respective UAVs, a need to share power and/or other resources, and/or for flight efficiency, such as on a windy or gusty day. In some embodiments, the decision may be made by a command station, such as a remote computing device or a central control management system.

Responsive to a decision to couple together, the first group of UAVs and the second group of UAVs may couple together via a coupling mechanism, as shown in block 712. The coupling mechanism may be a magnetic connector, an adhesive connector, a hook and loop connector, a ball and socket connector, a latch connector, a snap fit connector, or any other reasonable method of connecting one UAV to another.

In various embodiments, the coupling mechanism may comprise one or more arms which extend from an airframe of the UAV in any direction. In such embodiments the one or more arms may be rigid and/or telescopic. In various embodiments, the coupling mechanism may be mounted on an outer edge of the display. In such embodiments, the displays may physically lock together while the UAVs are in the formation. However, the displays may be coupled and yet have a space between each individual display in some embodiments.

While coupled together via the coupling mechanism, the first and the second groups of UAVs may transfer data, power, and/or other resources via a connection, as depicted at block 714. In some embodiments, the connection between the first and the second groups of UAVs may create a wired connection for data transfer. In such embodiments, the first and the second groups of UAVs may transfer flight data, data regarding other UAVs in the fleet, presentation data, and other like data. In some embodiments, the first and second groups of UAVs may transfer power via the connection. In such embodiments, the first group of UAVs may send power to the second group of UAVs to store in a battery and/or directly power one or more components in the second group of UAVs, or vice versa.

Responsive to a decision to not couple the first group of UAVs and the second group of UAVs, at block 716, the first group of UAVs and the second group of UAVs may fly in a formation relative to the other UAVs (or possibly relative to master UAV) in the respective group. In some embodiments, each of the UAVs of the first group of UAVs and the second group of UAVs may fly independently of one another. In some embodiments, each of the UAVs of the first group of UAVs and the second group of UAVs may be coupled to one another in the respective groups. Regardless of the coupling, in various embodiments, the UAVs may communicate and transmit data between one another, such as via one or more networks.

At block 718, a third image is provided for presentation on a third combined display, the third combined display comprising at least the first and second combined displays. In some embodiments, the third image may be provided by the respective control and/or display management system in the respective UAVs. In some embodiments, the third image may be provided by a command station, such as a remote computing device or a centralized control or display management system.

Figure 8:
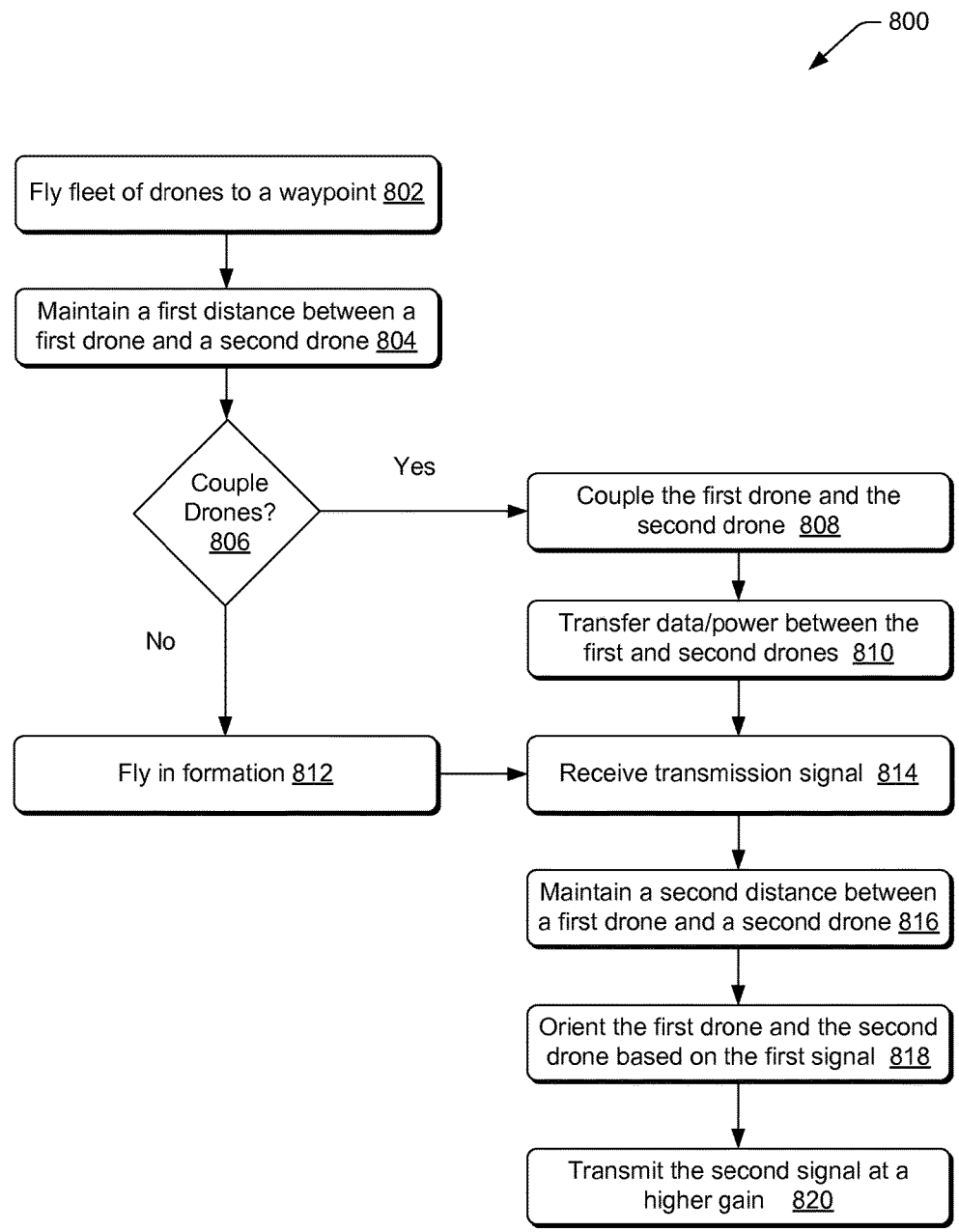
FIG. 8 is a flow diagram showing an illustrative process to launch a plurality of UAVs in a fleet of UAVs to transmit and receive signals as a combined antenna array.

FIG. 8 is a flow diagram showing an illustrative process 800 to launch a plurality of UAVs in a fleet of UAVs to transmit and receive signals as a combined antenna array.

At block 802, a control management system of each UAV in a fleet of UAVs, such as control management system 110, may cause the fleet of UAVs to fly to a waypoint. The waypoint may be a latitude, longitude, and altitude, a location on a 3-dimensional grid system, or any other way of designating a location. In some embodiments, the control management system may receive an instruction from a command station, such as a remote computing device or a centralized control management At block 804, the control management system on the first UAV and the control management system on the second UAV coordinate flight between the two UAVs to maintain a first distance between the two UAVs. In some embodiments, the first distance may be a distance which enables a first antenna to be in phase with a second antenna, the phase providing for increased gain, range, and distance in the transmission to avoid distortion. For example, the first distance may be less than half the wavelength of the transmission signal, to avoid grating lobes.

At block 806, the fleet of UAVs decides whether to couple together via one or more coupling mechanisms. In various embodiments, the decision to couple may be based upon a flight plan loaded into the respective UAVs. In some embodiments, the decision may be made by a master command station, such as a remote computing device or a central control management system.

Responsive to a decision to couple together, the first UAV and the second UAV may couple together via a coupling mechanism, as shown in block 808. The coupling mechanism may be a magnetic connector, an adhesive connector, a hook and loop connector, a ball and socket connector, a latch connector, a snap fit connector, or any other reasonable method of connecting one UAV to another.

In various embodiments, the coupling mechanism may comprise one or more arms which extend from an airframe of the UAV in any direction. In such embodiments the one or more arms may be rigid and/or telescopic. In some embodiments, the coupling mechanism may comprise a cable, such as a co-axial cable. In such embodiments, the cable may be retractable.

While coupled together via the coupling mechanism, the first and the second UAVs may transfer data, power, and/or other resources via a connection, as depicted at block 810. In some embodiments, the connection between the first and the second UAVs may create a wired connection for data transfer. In such embodiments, the first and the second UAVs may transfer flight data (e.g., latitude and longitude, grid coordinate data, orientation direction, orientation time, launch time, recovery time, etc.), data regarding other UAVs in the fleet, signal data (e.g., time for transmission, a time to awaken from a dormant mode for transmission or reception, etc.), and other like data. In some embodiments, the first and second UAVs may transfer power via the connection. In such embodiments, the first UAV may send power to the second UAV to store in a battery and/or directly power one or more components in the second UAV, or vice versa.

Responsive to a decision to not couple, at block 812, the UAVs may fly in a formation, maintaining distance between one another while flying independently.

At block 814, the first and/or second UAV connect to a base station. In various embodiments, the connection between the first and/or second UAV and the base station may wireless. In such embodiments, the base station may provide data to the UAVs. In some embodiments, the connection between the first and/or second UAV and the base station may be a wired connection. In such an embodiment, the coupling mechanism, such as a co-axial cable, may extend from the first and/or the second UAV to the base station. The base station may be a fixed or mobile location on the ground, or it may be another UAV.

At block 814, the first UAV and the second UAV receive a transmission signal from the base station. The signal may comprise a transmission data, such as, for example, a time for transmission, an orientation of the antenna, an altitude for the transmission, and the like.

At block 816, responsive to receiving the transmission signal, the control management system on the first UAV and the control management system on the second UAV coordinate flight between the two UAVs to maintain a second distance between the two UAVs. In various embodiments, the second distance may be based at least in part on the wavelength of the transmission signal.

At block 818, responsive to receiving the signal, the first UAV and the second UAV orient the respective antennae in the desired azimuth and elevation for transmission and/or reception of signals. Additionally or alternatively, the first UAV and the second UAV may climb or descend as required to maintain a desired altitude for the transmission.

At block 820, the first UAV and the second UAV, acting as a combined antenna array, transmit the second signal at the designated time and orientation. The combined antenna array may transmit the second signal at a higher gain than the first antenna or the second antenna operating independently.

Figure 9:
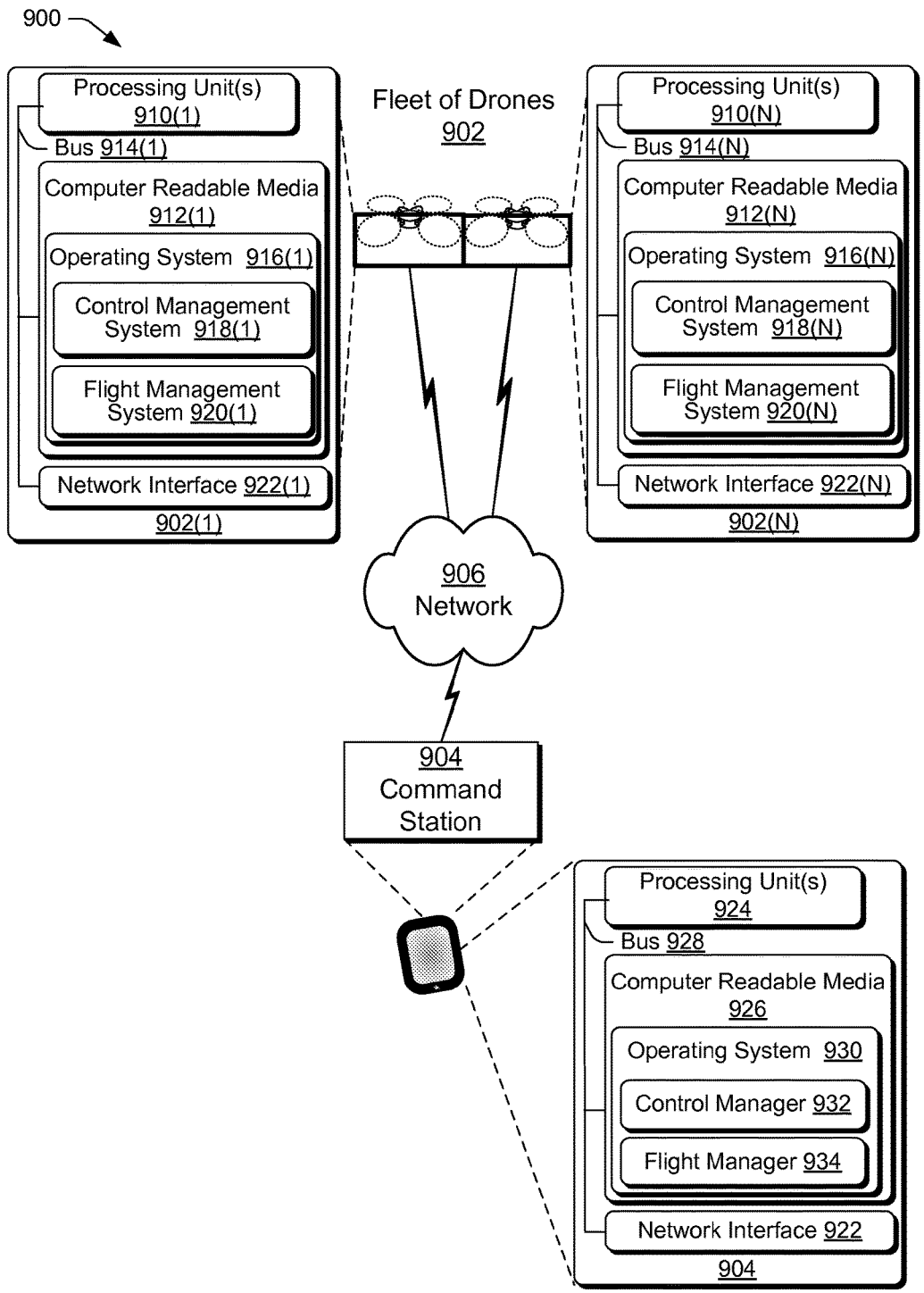
FIG. 9 is an illustrative embodiment in which the fleet of UAVs, such as fleet of UAVs, may operate.

FIG. 9 is an illustrative embodiment in which the fleet of UAVs, such as fleet of UAVs 200, may operate. The environment described below constitutes but one example and is not intended to limit the claims to any particular operating environment. Other environments can be used without departing from the spirit and scope of the claimed subject matter.

FIG. 9 shows an example environment 900 in which a fleet of UAVs 902 may operate. Each UAV of the fleet of UAVs 902, command station 904 and/or components of environment 900 may include a diverse variety of device types configured to communicate via one or more networks 906, and are not limited to any particular type of device. In some examples, command station 904 may include stationary devices, including but not limited to servers, desktop computers, personal computers, network-enabled televisions, terminals, game consoles, set-top boxes, gaming devices, work stations, and thin clients, such as those capable of operating a distributed computing resource. In some examples, remote device 904 may include mobile devices, including but not limited to mobile phones, tablet computers, mobile phone tablet hybrids, laptop computers, media players, and any other mobile computers or any other mobile telecommunication devices. In various examples, command station 904 may include any other sort of computing device configured to communicate via one or more networks 906.

For example, network 906 may include public networks such as the Internet, private networks such as an institutional and/or personal intranet, or some combination of private and public networks. Network 906 may also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMAX networks, mobile communications networks (e.g., 3G, 4G, and so forth) or any combination thereof. Network 906 may utilize communications protocols, including packet-based and/or datagram-based protocols such as internet protocol (IP), transmission control protocol (TCP), user datagram protocol (UDP), or other types of protocols. Moreover, network 906 may also include a number of devices that facilitate network communications and/or form a hardware basis for the networks, such as switches, routers, gateways, access points, firewalls, base stations, repeaters, backbone devices, and the like.

In some examples, network 906 may further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

The one or more UAVs of the fleet of UAVs 902 may include any computing device having one or more processing unit(s) 910 operably connected to computer-readable media 912, such as via a bus 914, which in some instances may include one or more of a system bus, a data bus, an address bus, a PCI bus, a Mini-PCI bus, and any variety of local, peripheral, and/or independent buses. Executable instructions stored on computer-readable media 912 may include, for example, an operating system 916, a control management system 918, a flight management system 920 and/or other modules and programs that are loadable and executable by processing units(s) 910.

The command station 904 may include any computing device having one or more processors 924 operably connected to computer-readable media 926, such as via a bus 928, which in some instances may include one or more of a system bus, a data bus, an address bus, a PCI bus, a Mini-PCI bus, and any variety of local, peripheral, and/or independent buses. Executable instructions stored on computer-readable media 926 may include, for example, an operating system 930, a control manager 932, a flight manager 934 and/or other modules and programs that are loadable and executable by processing units(s) 924.

The operating system 910 the one or more UAVs of the fleet of UAVs 902 may be any operating system including but not limited to MICROSOFT WINDOWS™, QNX™, IBM z/OS™, LINUX, ANDROID, iOS™, OS X™, NETBSD™, or any other operating system capable of managing computer hardware and software resources. In some examples, UAVs 902(1) and 902(N) may include operating system 916.

Additionally or alternatively, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

The one or more UAVs of the fleet of UAVs 902 and the command station 904 may also include one or more network interface(s) 922 to enable communications between command station 904, and the one or more UAVs of the fleet of UAVs 902, and/or between the UAVs of the fleet of UAVs 902, such as UAVs between 902(1) and 902(N). Such network interface(s) 922 may include one or more network interface controllers (NICs) or other types of transceiver devices to send and receive communications over a network. For example, network interface(s) 922 may include proximity interfaces to further enable communications between command station 904 and the one or more UAVs of the fleet of UAVs 902 and/or between the UAVs of the fleet of UAVs 902, such as UAVs 902(1) and 902(N). Such proximity interfaces can include one or more proximity network interface controllers or other types of transceiver devices to send and receive communications over a proximity network.

Communication between the command station 904 and the one or more UAVs of the fleet of UAVs 902 and/or between the UAVs of the fleet of UAVs 902, such as UAVs 902(1) and 902(N), may be possible via a wired or a wireless signal. The wireless signal may include but is not limited to, Bluetooth, radio control, voice control, electromagnetic waves, Wi-Fi signals, cell phone signals, or some combination thereof. Remote device 904 may send the signals via network 906 to the control management system 918, such as control management system 110. Upon receiving the signals, control management system 918 may adjust the motor speed, rotor speed, and/or rotor pitch as necessary to reflect the desire of the command station 904.

In various embodiments, each UAV of the fleet of UAV 902 may be configured to fly autonomously based upon flight plan data stored in a control management system and/or a flight management system, such as flight management system 112. Each UAV of the fleet of UAVs 902 may be configured to update positioning data to the command station 904 via network 906. In such embodiments, a user may track the position of the each UAV of the fleet of UAVs 902 throughout the flight plan, and alter the flight plan via the control manager 932 and/or in a flight manager 934 in the command station 904, as necessary.

In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The process can also be practiced in a distributed computing environment where functions are performed by remote processing devices that are linked through a communication network. In a distributed computing environment, computer-executable instructions can be located in local and/or remote computer storage media, including memory storage devices.

In the context of hardware, some or all of the blocks can represent application specific integrated circuits (ASICs) or other physical components that perform the recited operations.

The order in which the operations are described is not intended to be construed as a limitation, and any number of the described operations can be executed in any order, combined in any order, subdivided into multiple sub-operations, and/or executed in parallel to implement the described process.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system including a fleet of unmanned aerial vehicles (UAVs), the system comprising:
   a first UAV comprising:
      a first airframe comprising a first coupling mechanism, wherein the first coupling mechanism comprises a removable connector that, when installed, is configured to couple to a second coupling mechanism;
      a first display screen coupled to the first airframe;
      a third coupling mechanism coupled to the first display screen;
      a first propulsion system coupled to the first airframe;
      a first control management system coupled to the first airframe and configured to send first signals to the first propulsion system to maintain a first flight plan, wherein the first control management system is further configured to receive sensor data from a sensor of a second UAV to stabilize a flight of the fleet of UAVs; and
      a first display management system coupled to the first airframe and configured to process data and cause a first part of an image to be displayed on the first display screen; and
   the second UAV comprising:
      a second airframe comprising the second coupling mechanism;
      the sensor, coupled to the second airframe, configured to collect the sensor data and transmit the sensor data to the first UAV, the sensor comprising one or more of an accelerometer or a gyroscope;
      a second display screen coupled to the second airframe;
      a fourth coupling mechanism coupled to the second display screen, the fourth coupling mechanism configured to couple to the third coupling mechanism;
      a second propulsion system coupled to the second airframe;
      a second control management system coupled to the second airframe and configured to send second signals to the second propulsion system to maintain a second flight plan; and
      a second display management system coupled to the second airframe and configured to process data and cause a second part of the image to be displayed on the second display screen.

2. The system as recited in claim 1, wherein the first UAV is a master UAV configured to receive the first flight plan from a controller, and wherein the second UAV is a servant of the master UAV and is configured to implement the second flight plan based at least in part on instructions received from the master UAV.

3. The system as recited in claim 1, wherein:
   the first control management system is further configured to receive the first flight plan from a remote computing device; and
   the second control management system is further configured to receive the second flight plan from the first control management system.

4. The system as recited in claim 1, wherein:
   the first display management system is further configured to receive the first part of the image from a remote computing device; and
   the second display management system is further configured to receive the second part of the image from the first display management system.

5. A fleet of unmanned aerial vehicles (UAVs) comprising:
   a first group of UAVs comprising:
      a first UAV comprising:
         a first airframe comprising a first coupling mechanism, wherein the first coupling mechanism is configured to couple to a second coupling mechanism of a second airframe of the fleet of UAVs;
         a first display screen coupled to the first airframe;
         a third coupling mechanism coupled to the first display screen;
         a first propulsion system coupled to the first airframe; and
         a first control management system configured to send first signals to the first propulsion system to maintain a first collective flight plan, to send second signals to a second UAV of the first group of UAVs to share battery power data or flight duration data, and to receive sensor data from a sensor of the second UAV to stabilize a flight of the first group of UAVs wherein the first collective flight plan is based at least in part on the first group of UAVs flying proximate to one another such that each individual ones of display screens create a first display array; and
      the second UAV comprising:
         the second airframe comprising the second coupling mechanism;
         the sensor, coupled to the second airframe, configured to collect the sensor data and transmit the sensor data to the first UAV, the sensor comprising one or more of an accelerometer or a gyroscope;
         a second display screen;

a fourth coupling mechanism coupled to the second display screen, the fourth coupling mechanism configured to couple to the third coupling mechanism;
a second propulsion system; and
a second control management system configured to send third signals to the second propulsion system to maintain a second collective flight plan and to send fourth signals to at least the first UAV to share one of battery power data or flight duration data.

6. The fleet of UAVs as recited in claim 5, wherein the first UAV has a greater battery charge than the second UAV, and wherein the first control management system is further configured to transfer battery power from the first UAV to the second UAV via the first coupling mechanism and the second coupling mechanism.

7. The fleet of UAVs as recited in claim 5, wherein at least the first control management system is further configured to:
process data to be presented on the first display screen, wherein a presentation on each display screen of the first group of UAVs comprises a portion of an image presented on the first display array.

8. The fleet of UAVs as recited in claim 7, wherein the first control management system is further configured to:
send fifth signals to the first propulsion system to maintain a third collective flight plan, wherein the third collective flight plan causes a second group of UAVs to:
separate from the first group of UAVs;
fly proximate to one another such that individual ones of display screens of the second group of UAVs create a second display array; and
maintain a plurality of distances from the first group of UAVs;
wherein a first portion of the image is presented on the first display array and a second portion of the image is presented on the second display array.

9. The fleet of UAVs as recited in claim 5, wherein the first control management system is further configured to receive a media plan from a remote computing device.

10. The fleet of UAVs as recited in claim 5, wherein the first display screen comprises one or more apertures to allow air to flow laterally through the first display screen.

11. The fleet of UAVs as recited in claim 5, wherein the individual ones of the first group of UAVs further comprises a fifth coupling mechanism configured to couple to at least another display screen.

12. The fleet of UAVs as recited in claim 11, wherein the fifth coupling mechanism is located on an outer edge of a corresponding display screen, and comprises one or more of:
a magnetic connector;
a latch connector; or
a snap fit connector.

13. The fleet of UAVs as recited in claim 5, wherein the first coupling mechanism comprises an extendable arm comprising one or more of:
a magnetic connector;
a ball and socket connector; or
a snap fit connector.

14. The fleet of UAVs as recited in claim 5, further comprising:
a second group of UAVs, wherein individual ones of the second group of UAVs comprise:
a third airframe;
a third display screen coupled to the third airframe;
a third propulsion system coupled to the third airframe; and a third control management system coupled to the third airframe and configured to:
send fourth signals to the third propulsion system to maintain a third collective flight plan, wherein the third collective flight plan is based at least in part on the second group of UAVs flying proximate to one another such that each of the individual ones of corresponding display screens create a second display array; and
cause a presentation of data on the second display array.

15. The fleet of UAVs as claim 5 recites, wherein the first UAV comprises:
a speaker system coupled to the first airframe to output an audio presentation based at least in part on a visual presentation depicted on the first display array.

16. A method comprising:
maintaining a first distance between a first unmanned aerial vehicle (UAV) and a second UAV, the first distance being a distance in which a first display on the first UAV and a second display on the second UAV combine for a visual effect of a first display array;
coupling the first UAV to the second UAV by extending a first coupling mechanism of the first UAV to an extended position such that a first connector of the first coupling mechanism couples to a second connector of a second coupling mechanism of the second UAV;
coupling the first display of the first UAV to the second display of the second UAV by coupling a third coupling mechanism of the first UAV to a fourth coupling mechanism of the second UAV;
presenting a first portion of an image on the first display;
presenting a second portion of the image on the second display, wherein the first portion of the image and the second portion of the image combine to create a presentation of the image on the first display array;
causing sensor data captured by a sensor of the second UAV to be sent from the second UAV to the first UAV, the sensor comprising one or more of an accelerometer or a gyroscope;
determining, based at least in part on the sensor data, a flight adjustment to maintain a flight plan;
causing, based at least in part on the flight adjustment, a stabilization of a flight of the first UAV and the second UAV; and
sending, from the first UAV to the second UAV, a signal to instruct the second UAV, the signal comprising at least one of malfunction data, battery power data, or flight duration data associated with the first UAV.

17. The method as recited in claim 16, further comprising:
transferring data between the first UAV and the second UAV via the first connector and the second connector.

18. The method as recited in claim 16, further comprising:
deploying a third UAV and a fourth UAV;
maintaining a second distance between the third UAV and the fourth UAV, wherein a third display of the third UAV and the fourth display of the fourth UAV combine for a visual effect of a second display array;
presenting at least a first portion of a second image on the third display; and
presenting at least a second portion of the second image on the fourth display, wherein the second image on the second display array corresponds to the presentation on the first display array.

19. The method as recited in claim 18, further comprising:
positioning the third UAV and the fourth UAV to maintain the first distance between:

the first UAV and the third UAV; and
the second UAV and the fourth UAV,
  wherein the first display, the second display, the third display, and the fourth display combine for a visual effect of a third display array.
20. The method as recited in claim 16, further comprising:
determining, based at least in part on the battery power data, whether the first UAV has a greater battery charge than the second UAV; and
transferring, based at least in part on determining the first UAV has a greater battery charge than the second UAV, battery power from the first UAV to the second UAV via the first coupling mechanism and the second coupling mechanism.

* * * * *